US012554929B2

(12) United States Patent
Kanuga et al.

(10) Patent No.: US 12,554,929 B2
(45) Date of Patent: Feb. 17, 2026

(54) TECHNIQUES FOR USING NAMED ENTITY RECOGNITION TO RESOLVE ENTITY EXPRESSION IN TRANSFORMING NATURAL LANGUAGE TO A MEANING REPRESENTATION LANGUAGE

(71) Applicant: Oracle International Corporation, Redwood Shores, CA (US)

(72) Inventors: Aashna Devang Kanuga, Foster City, CA (US); Cong Duy Vu Hoang, Wantirna South (AU); Mark Edward Johnson, Sydney (AU); Vasisht Raghavendra, San Mateo, CA (US); Yuanxu Wu, Foster City, CA (US); Steve Wai-Chun Siu, Melbourne (AU); Nitika Mathur, Melbourne (AU); Gioacchino Tangari, Sydney (AU); Shubham Pawankumar Shah, Foster City, CA (US); Vanshika Sridharan, San Mateo, CA (US); Zikai Li, Redwood City, CA (US); Diego Andres Cornejo Barra, Chicago, IL (US); Stephen Andrew McRitchie, Palo Alto, CA (US); Christopher Mark Broadbent, Wellington, FL (US); Vishal Vishnoi, Redwood City, CA (US); Srinivasa Phani Kumar Gadde, Fremont, CA (US); Poorya Zaremoodi, Melbourne (AU); Thanh Long Duong, Seabrook (AU); Bhagya Gayathri Hettige, Melbourne (AU); Tuyen Quang Pham, Springvale (AU); Arash Shamaei, Kirkland, WA (US); Thanh Tien Vu, Herston (AU); Yakupitiyage Don Thanuja Samodhve Dharmasiri, Melbourne (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 397 days.

(21) Appl. No.: 18/351,680

(22) Filed: Jul. 13, 2023

(65) Prior Publication Data
US 2024/0062011 A1 Feb. 22, 2024

Related U.S. Application Data

(60) Provisional application No. 63/373,180, filed on Aug. 22, 2022.

(51) Int. Cl.
*G06F 40/295* (2020.01)
*G06F 40/211* (2020.01)
(Continued)

(52) U.S. Cl.
CPC .......... *G06F 40/295* (2020.01); *G06F 40/211* (2020.01); *G06F 40/284* (2020.01); *G06F 40/35* (2020.01)

(58) Field of Classification Search
CPC .... G06F 40/295; G06F 40/284; G06F 40/211; G06F 40/35
See application file for complete search history.

(56) References Cited

U.S. PATENT DOCUMENTS

| 11,720,559 B2 * | 8/2023 | Lin ........................ G06N 3/044 |
| | | 707/760 |
| 11,762,990 B2 * | 9/2023 | Gururajan ........... H04L 63/1483 |
| | | 726/23 |

(Continued)

OTHER PUBLICATIONS

Wang et al., "RAT-SQL: Relation-Aware Schema Encoding and Linking for Text-to-SQL Parsers", 2021, 12 pages.

*Primary Examiner* — Richemond Dorvil
*Assistant Examiner* — Ethan Daniel Kim
(74) *Attorney, Agent, or Firm* — Kilpatrick Townsend & Stockton LLP

(57) ABSTRACT

Techniques are disclosed herein for using named entity recognition to resolve entity expression while transforming natural language to a meaning representation language. In one aspect, a method includes accessing natural language text, predicting, by a first machine learning model, a class label for a token in the natural language text, predicting, by a second machine-learning model, operators for a meaning representation language and a value or value span for each (Continued)

attribute of the operators, in response to determining that the value or value span for a particular attribute matches the class label, converting a portion of the natural language text for the value or value span into a resolved format, and outputting syntax for the meaning representation language. The syntax comprises the operators with the portion of the natural language text for the value or value span in the resolved format.

20 Claims, 12 Drawing Sheets

(51) Int. Cl.
    *G06F 40/284*      (2020.01)
    *G06F 40/35*      (2020.01)

(56) References Cited

U.S. PATENT DOCUMENTS

| | | | |
|---|---|---|---|
| 11,934,801 B2* | 3/2024 | Rahmani | G06F 8/33 |
| 2022/0129450 A1* | 4/2022 | Cao | G06F 16/2433 |
| 2024/0176805 A1* | 5/2024 | Liu | G06F 40/295 |

* cited by examiner

TECHNIQUES FOR USING NAMED ENTITY RECOGNITION TO RESOLVE ENTITY EXPRESSION IN TRANSFORMING NATURAL LANGUAGE TO A MEANING REPRESENTATION LANGUAGE

CROSS-REFERENCE TO RELATED APPLICATION

The present application is a non-provisional application of and claims the benefit and priority under 35 U.S.C. 119(e) of U.S. Provisional Application No. 63/373,180, filed Aug. 22, 2022, the entire contents of which is incorporated herein by reference for all purposes.

FIELD

The present disclosure relates generally to transforming natural language to a logical form, and more particularly, to techniques for using named entity recognition (NER) to resolve entity (e.g., data and time) expressions while transforming natural language to a logical form such as a meaning representation language (MRL).

BACKGROUND

Artificial intelligence has many applications. To illustrate, many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Artificial intelligence-based solutions, such as chatbots, may have both analog (human) and digital (machine) interfaces for interacting with a human and connecting to a backend system. It is advantageous to be able to extract and analyze the meaning of an utterance (e.g., a request) when a human makes one using natural language, independent of how a backend system will handle the utterance. As an example, a request might be for data that needs to be retrieved from a relational database, or the requested data might need to be extracted from a knowledge graph. A MRL is a versatile representation of a natural language utterance that a chatbot can translate into any number of target machine-oriented languages. As such, an MRL can be utilized by a chatbot to communicate interchangeably with both a human and various backend systems, including systems that communicate using Structured Query Language (SQL), Application Programming Interfaces (APIs), REpresentational State Transfer (REST), Graph Query Language (GraphQL), Property Graph Query Language (PGQL), etc.

For example, SQL is a standard database management language for interacting with relational databases. SQL can be used for storing, manipulating, retrieving, and/or otherwise managing data held in a relational database management system (RDBMS) and/or for stream processing in a relational data stream management system (RDSMS). SQL includes statements or commands that are used to interact with relational databases. SQL statements or commands are classified into, among others, data query language (DQL) statements, data definition language (DDL) statements, data control language (DCL) statements, and data manipulation language (DML) statements. To interact with relational databases using SQL, users must know how the database is structured (e.g., knowledge of the tables and rows and columns within each table), SQL syntax, and how to relate the syntax to the database structure. Without this knowledge, users often have difficultly using SQL to interact with these relational databases.

Natural language interfaces (e.g., chatbots) to databases systems (NLIDB) such as RDBMS provide users with a means to interact with these relational databases in an intuitive way without requiring knowledge of a database management language. For example, using natural language statement and queries (i.e., natural language querying), users can interact with these relational databases, via a NLIDB, with plain language. Recently, text-to-SQL systems have become popular and deep learning approaches to converting natural language queries to SQL queries have proved promising. Using semantic parsing, natural language statements, requests, and questions (i.e., sentences) can be transformed into machine-oriented language that can be executed by an application (e.g., chatbot, model, program, machine, etc.). For example, semantic parsing can transform natural language sentences into general purpose programming languages such as Python, Java, and SQL. Processes for transforming natural language sentences to SQL queries typically include rule-based, statistical-based, and/or deep learning-based systems. Rule-based systems typically use a series of fixed rules to translate the natural language sentences to SQL queries. These rule-based systems are generally domain-specific and, thus, are considered inelastic and do not generalize well to new use cases (e.g., across different domains). Statistical-based systems, such as slot-filling, label tokens (i.e., words or phrases) in an input natural language sentence according to their semantic role in the sentence and use the labels to fill slots in the SQL query. Generally, these statistical-based systems have limitations on the types of sentences that can be parsed (e.g., a sentence must be able to be represented as a parse tree). Deep-learning based systems, such as sequence-to-sequence models, involve training deep-learning models that directly translate the natural language sentences to machine-oriented languages and have been shown to generalize across tasks, domains, and datasets. However, such deep-learning systems require a large amount of training data for supervised learning, and it is challenging to obtain labelled data (e.g., natural language query-SQL statement pairings). Thus, translating natural language sentences to machine-oriented languages based on deep-learning cannot avoid the need for a large amount of labelled training data.

BRIEF SUMMARY

Machine-learning techniques are provided (e.g., a method, a system, non-transitory computer-readable medium storing code or instructions executable by one or more processors) for using NER to resolve entity (e.g., data and time) expressions while transforming natural language to a logical form such as a MRL (e.g., Oracle Meaning Representation Language (OMRL)).

In various embodiments, a computer-implemented method is provided that comprises: accessing natural language text; predicting, by a first machine learning model, a class label for a token in the natural language text, wherein the class label is representative of an individual named entity or a composite named entity; based on (a) the natural language text, (b) the class label predicted by the first machine-learning model, and (c) one or more Relation-Aware Transformer features corresponding to the class label predicted by the first machine-learning model, predicting, by a second machine-learning model, one or more operators for a meaning representation language and a value or value span for each of one or more attributes of the one or more operators; determining whether the value or value span for a particular attribute of the one or more attributes matches the class label; in response to determining that the value or value span for the particular attribute matches the class label, converting a portion of the natural language text for the value or value span into a resolved format; and outputting syntax for the meaning representation language, wherein the syntax comprises the one or more operators with the portion of the natural language text for the value or value span in the resolved format.

In some embodiments, the class label is a composite named entity label representative of the composite named entity and the composite named entity label comprises multiple named entity classes including a parent class and a child class.

In some embodiments, the method further comprises extracting an entity hierarchy from the composite named entity label based on a hierarchy template associated with the composite named entity label, wherein the entity hierarchy comprises the multiple named entity classes in a hierarchical structure, wherein the value or value span for the particular attribute is determined to match the class based on the entity hierarchy, and wherein the natural language text for the value or value span is converted into the resolved format based on the entity hierarchy.

In some embodiments, the method further comprising processing the syntax based on the entity hierarchy, wherein the processing comprises looking up information related to the syntax in a computing system, and generating dialogue with the user based on the information and the entity hierarchy.

In some embodiments, the second machine-learning model determines the value or the value span for each of the one or more attributes of the one or more operators based on the Relation-Aware Transformer features, and does not perform named entity recognition for the value or the value spans for the one or more attributes.

In some embodiments, the method further comprises generating converted syntax by converting the syntax for the meaning representation language into a system language, and executing a query or an operation on a computing system using the converted syntax.

In some embodiments, the first machine learning model is a pre-trained named entity recognition model and the second machine learning model comprises an encoder component and a decoder component, and wherein the encoder component includes: (1) a first encoder, which is a Pre-trained Language Model (PLM), and (2) a second encoder, which is a Relation-Aware Transformer (RAT).

In various embodiments, a system is provided that includes one or more processors and one or more computer-readable media storing instructions which, when executed by the one or more processors, cause the system to perform part or all of the operations and/or methods disclosed herein.

In various embodiments, one or more non-transitory computer-readable media are provided for storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
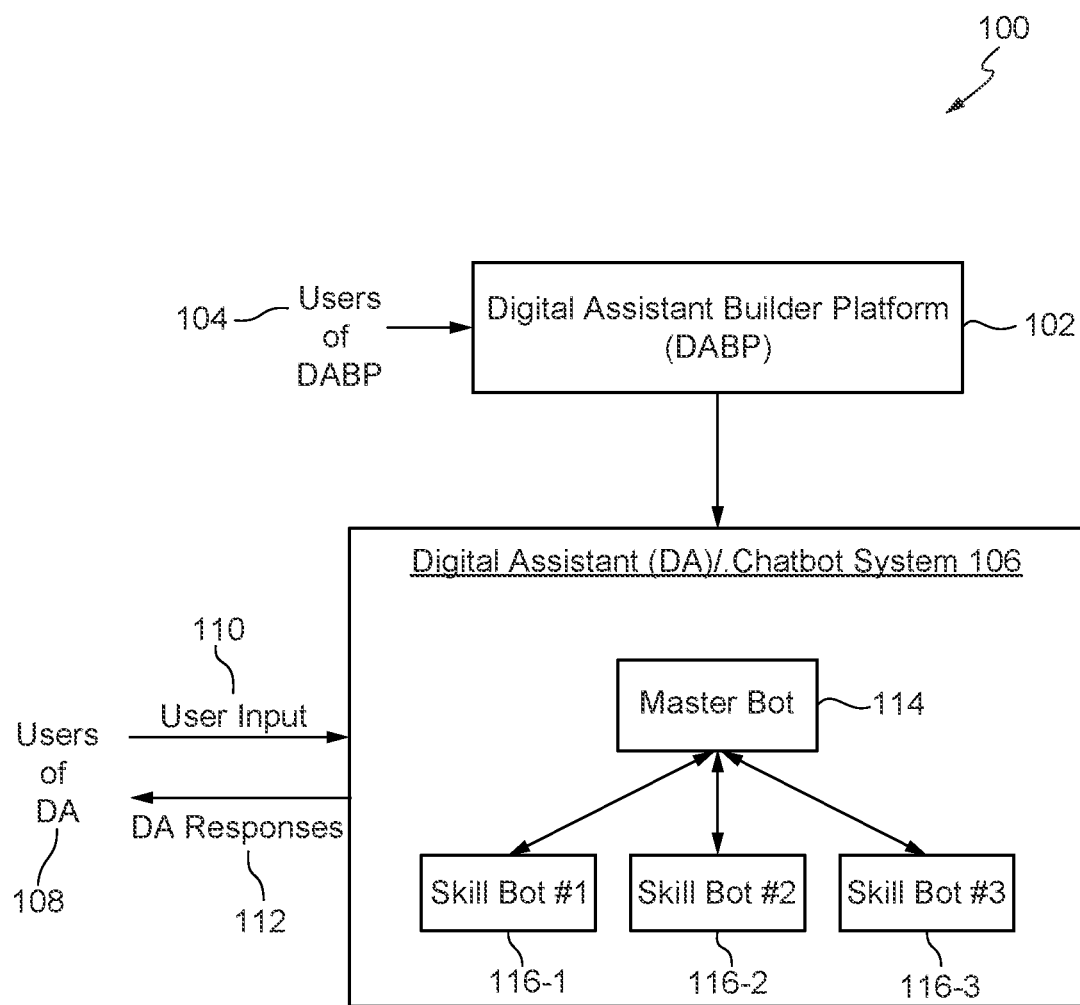
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

In recent years, the amount of data powering different industries and their systems has been increasing exponentially. A majority of business information is stored in the form of relational databases that store, process, and retrieve data. Databases power information systems across multiple industries, for instance, consumer tech (e.g., orders, cancellations, refunds), supply chain (e.g., raw materials, stocks, vendors), healthcare (e.g., medical records), finance (e.g., financial business metrics), customer support, search engines, and much more. It is imperative for modern data-driven companies to track the real-time state of its business in order to quickly understand and diagnose any emerging issues, trends, or anomalies in the data and take immediate corrective actions. This work is usually performed manually by analysts who compose complex queries in query languages (e.g., database query languages such as declarative query languages) like SQL, PGQL, logical database queries, API query languages such as GraphQL, REST, and so forth. Composing such queries can be used to derive insightful information from data stored in multiple tables. These results are typically processed in the form of charts or graphs to enable users to quickly visualize the results and facilitate data-driven decision making.

Although common database queries (e.g., SQL queries) are often predefined and incorporated in commercial products, any new or follow-up queries still need to be manually coded by the analysts. Such static interactions between database queries and consumption of the corresponding results require time-consuming manual intervention and result in slow feedback cycles. It is vastly more efficient to have non-technical users (e.g., business leaders, doctors, or other users of the data) directly interact with the analytics tables via natural language (NL) queries that abstract away the underlying query language (e.g., SQL) code. Defining the database query requires a strong understanding of database schema and query language syntax and can quickly get overwhelming for beginners and non-technical stakeholders. Efforts to bridge this communication gap have led to the development of a new type of processing called NLIDB. This natural search capability has become more popular over recent years as companies are developing deep-learning approaches for natural language to logical form (NL2LF) such as natural language to SQL (NL2SQL). In the present context, logical form of a natural language statement or utterance is a precisely specified semantic version of that statement or utterance in a formal system such as meaning representation languages (MRL) and/or machine-oriented languages (e.g., SQL or PGQL). NL2SQL seeks to transform natural language questions to SQL, allowing individuals to run unstructured queries against databases. The converted SQL could also enable digital assistants such as chatbots and others to improve their responses when the answer can be found in different databases or tables.

In the specific context of converting NL to a meaning representation language, a NL utterance (e.g., a user's question) is typically provided to a NL2LF model, which converts the NL utterance into a logical form, for example, an intermediate database query language such as Oracle Meaning Representation Query Language (OMRQL)—referred to herein as Oracle Meaning Representation Language (OMRL). The NL2LF model is a machine learning model trained to generate intermediate representations from NL utterances. The intermediate representation can then be translated to one or more desired query formats, such as SQL or PGQL using a translation process. Thereafter, the utterance in the desired query format may be executed on a system such as database to obtain data relevant to the query and formulate a response to the NL utterance (e.g., an answer to the user's question) for review by a user.

In order to translate the NL to a logical form or intermediate representation and/or use information in the NL to execute the utterance in the desired query format, information is extracted by the NL2LF system from the NL utterance including named entities. The particular problem addressed herein pertains to named entity recognition and resolution while translating NL to a logical form or intermediate representation. Named entities can be understood as nouns with a given text such as an utterance form a user and are often referred to as slots. Named entities are typically things like date, time, cities, names, brands etc., (a few common entities used as examples herein are domain independent, called System Entities: PERSON, NUMBER, CURRENCY, DATE_TIME; however, it should be understood that this disclosure is not limited to these system entities and is applicable any entity type such as composite entities, entity roles, entity lists, and the like). For example, with respect to the domain of travel, capturing the cities of departure, destination, travel mode, price, dates and times is at the foundation of the interface. However, capturing the named entities is a difficult task for the NL2LF system because users enter data in various languages under various contexts and randomly in no particular order. The following Table 1 shows a couple of examples of the entity extraction problem input (utterances) and outputs (entities):

TABLE 1

| Input Utterance | Entity Extraction Output |
| --- | --- |
| $60 for a cab ride on 12/2 | CURRENCY: $60 |
|  | TIME_DATE: 12/2 |
| show me rowland's directs | PERSON: rowland |

Nonetheless, capturing these entities are important for the NL2LF system to take action based on the user's natural language utterance.

Accordingly, approaches are needed to address these challenges and others. The developed approaches described herein use a pretrained NER model to recognize and resolve named entities such as date and time expressions, in transforming natural language to a logical form or intermediate representation. In this approach, the pretrained NER model is used to understand named entities (including hierarchical entities described in detail herein) such as date and time expressions (e.g., "in 5 days", etc). For example, "due date is after today" would translate into due date>'2022-02-21', where the NER model resolves "today" into the timex token 2022-02-21 (i.e., the date for today). Advantageously, this approach leverages a pre-existing system NER model such as a pretrained NER model used with a digital assistant. Moreover, the implementation details are obscured from the users, so they don't need to provide derived (e.g., precomputed) entity resolution columns, the complexity of the NL2LF model (i.e., the semantic parser) is reduced since there is no need for designing representations for named entity expressions, and a lesser amount of training data is required for the NL2LF model since the NL2LF model is not tasked with the named entity recognition and the NER model is pretrained.

In various embodiments, a computer-implemented method is provided that includes: accessing natural language text; predicting, by a first machine learning model, a class label for a token in the natural language text, where the class label is representative of an individual named entity or a composite named entity; based on (a) the natural language text, (b) the class label predicted by the first machine-learning model, and (c) one or more Relation-Aware Transformer features corresponding to the class label predicted by the first machine-learning model, predicting, by a second machine-learning model, one or more operators for a meaning representation language and a value or value span for each of one or more attributes of the one or more operators; determining whether the value or value span for a particular attribute of the one or more attributes matches the class label; in response to determining that the value or value span for the particular attribute matches the class label, converting a portion of the natural language text for the value or value span into a resolved format; and outputting syntax for the meaning representation language, wherein the syntax comprises the one or more operators with the portion of the natural language text for the value or value span in the resolved format.

As used herein, when an action is "based on" something, this means the action is based at least in part on at least a part of the something. As used herein, the terms "similarly", "substantially," "approximately" and "about" are defined as being largely but not necessarily wholly what is specified (and include wholly what is specified) as understood by one of ordinary skill in the art. In any disclosed embodiment, the term "similarly", "substantially," "approximately," or "about" may be substituted with "within [a percentage] of" what is specified, where the percentage includes 0.1, 1, 5, and 10 percent.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can be communicated by various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
  (a) a context section
  (b) a default transitions section
  (c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot— DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
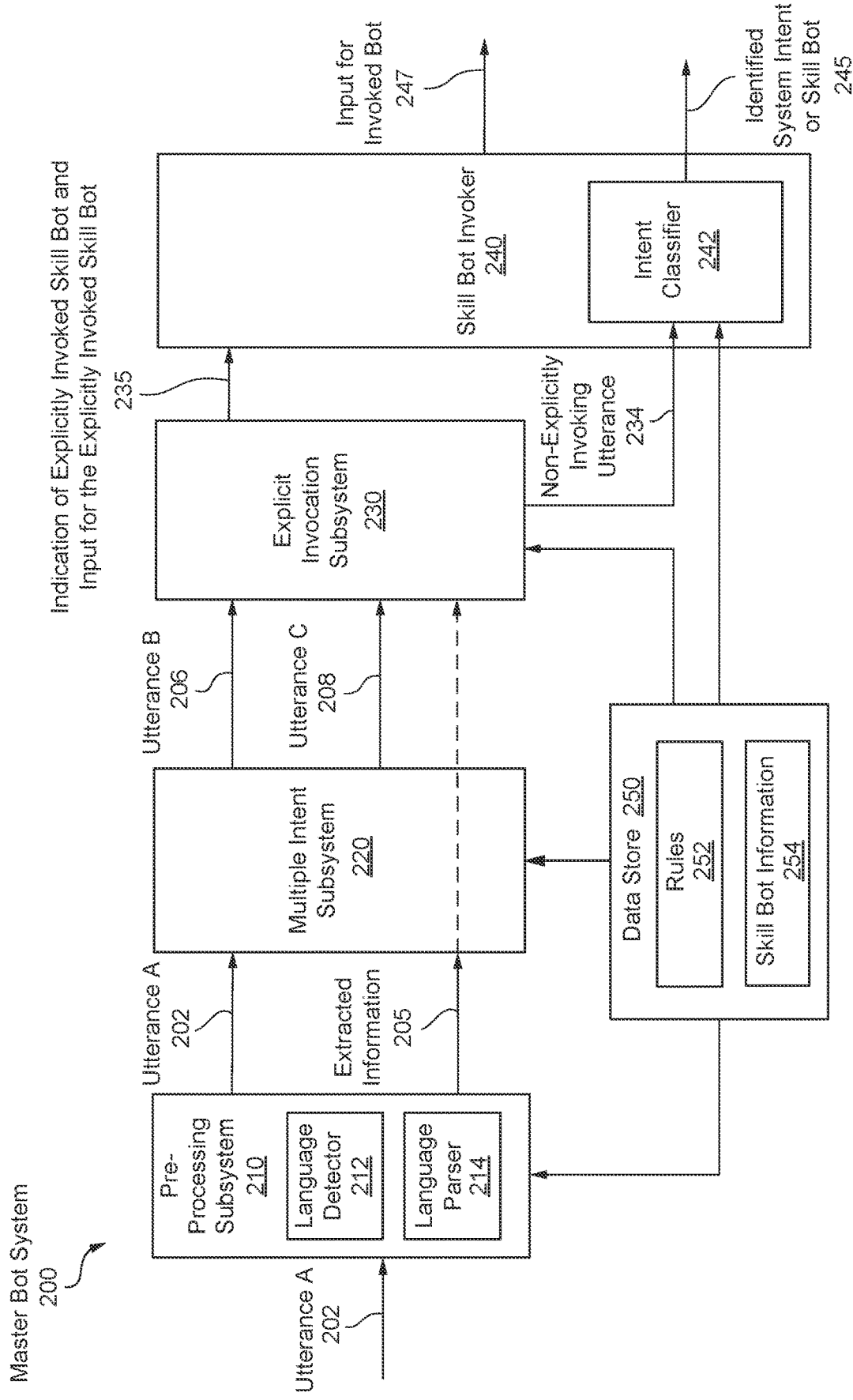
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
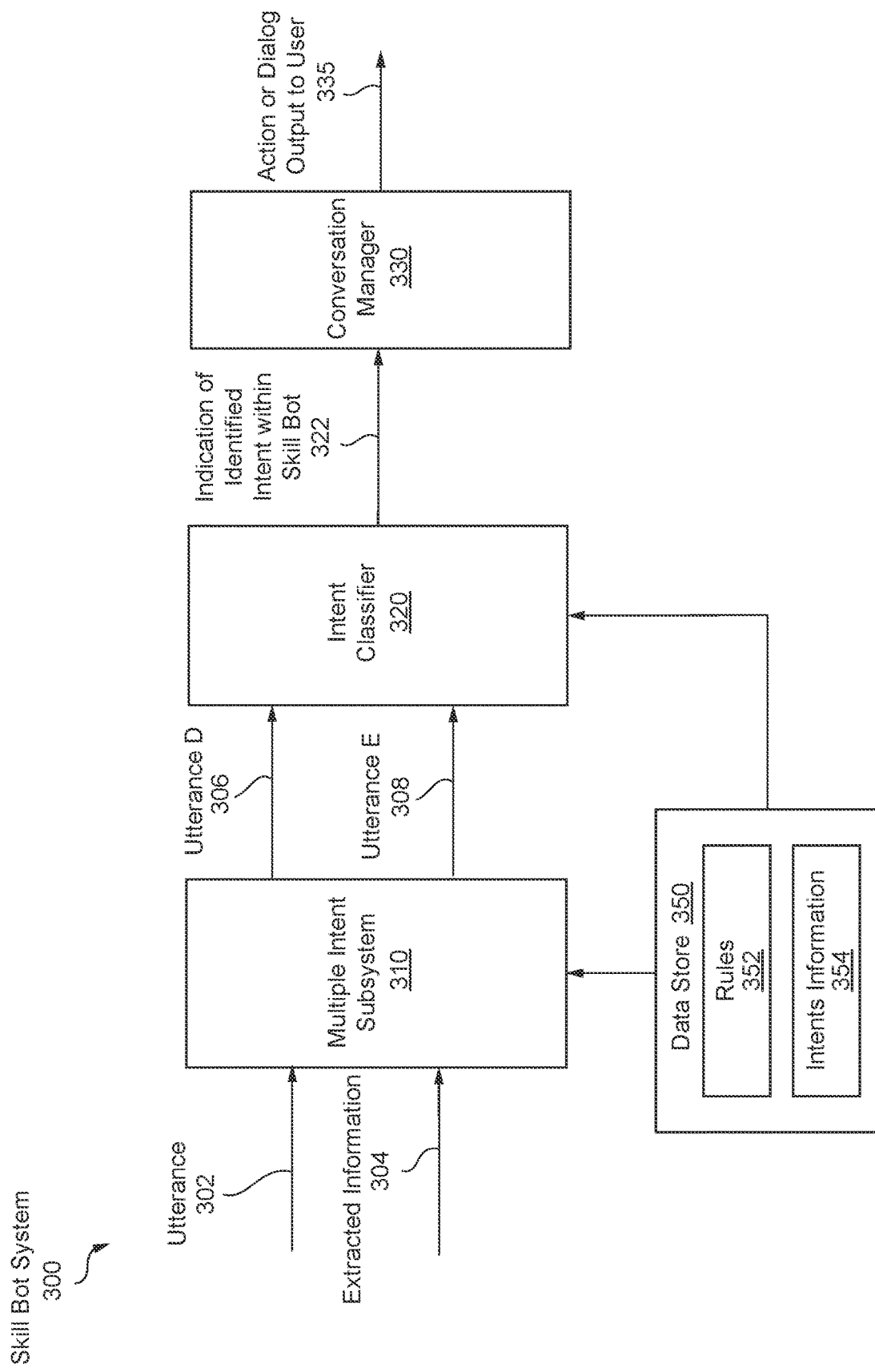
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Converting a Natural Language Utterance to a Logical Form Query

A NL2LF system or a conversation to MRL (C2MRL such as conversation-to-Oracle Meaning Representation Language (C2OMRL)) system is powered by a deep learning model configured to convert a natural language (NL) utterance (e.g., a query posed by a user using a digital assistant or chatbot) into a logical form, for example, an intermediate database query language such as Oracle Meaning Representation Language (OMRL). The logical form can be used to generate a query in a specific system query language (e.g., SQL), which can then be executed for querying a system such as a database to obtain an answer to the user's utterance. During the conversion process from NL to logical form it may be of interest to recognize named entities within the NL utterance to facilitate the conversion and/or query. One conventional approach to handle NER in a NL2LF system, is to create derived attributes for the named entity expressions. This approach however can quickly increase the size of the logical model and further contribute to attribute confusion. Also, a user would need to provide the derived attribute columns, which may be a time-consuming manual process. Another conventional approach to handle NER in a NL2LF system is using the semantic parser to understand the named entity expressions. In this approach the semantic parser produces a structured representation for expressions, e.g., "due 2 days later" could be represented by due date=$today+2*$day. However, this approach requires manually designing representations for the named entity expressions and creating additional training data for the named entity expressions.

To overcome these challenges and others, described herein are approaches to use an existing NER system (e.g., a pretrained model) to recognize and resolve named entities such as system entities (e.g., date and time expressions) in the NL2FL system. In these approaches, the existing NER system is used to understand named entity expressions such as timex expression, e.g., "in 5 days", etc. For example, "due date is after today" would translate into due date>'2022-02-21', where the NER resolves "today" into the timex token 2022-02-21 (i.e., the date for today). Leveraging the already existing NER system has the following advantages: (i) the details are hidden from the users, so they don't need to provide derived (i.e., precomputed) columns, (ii) the complexity of the semantic parser is reduced because there is no need for designing representations for named entity expressions, and (iii) a reduced amount of training data is required.

Figure 4:
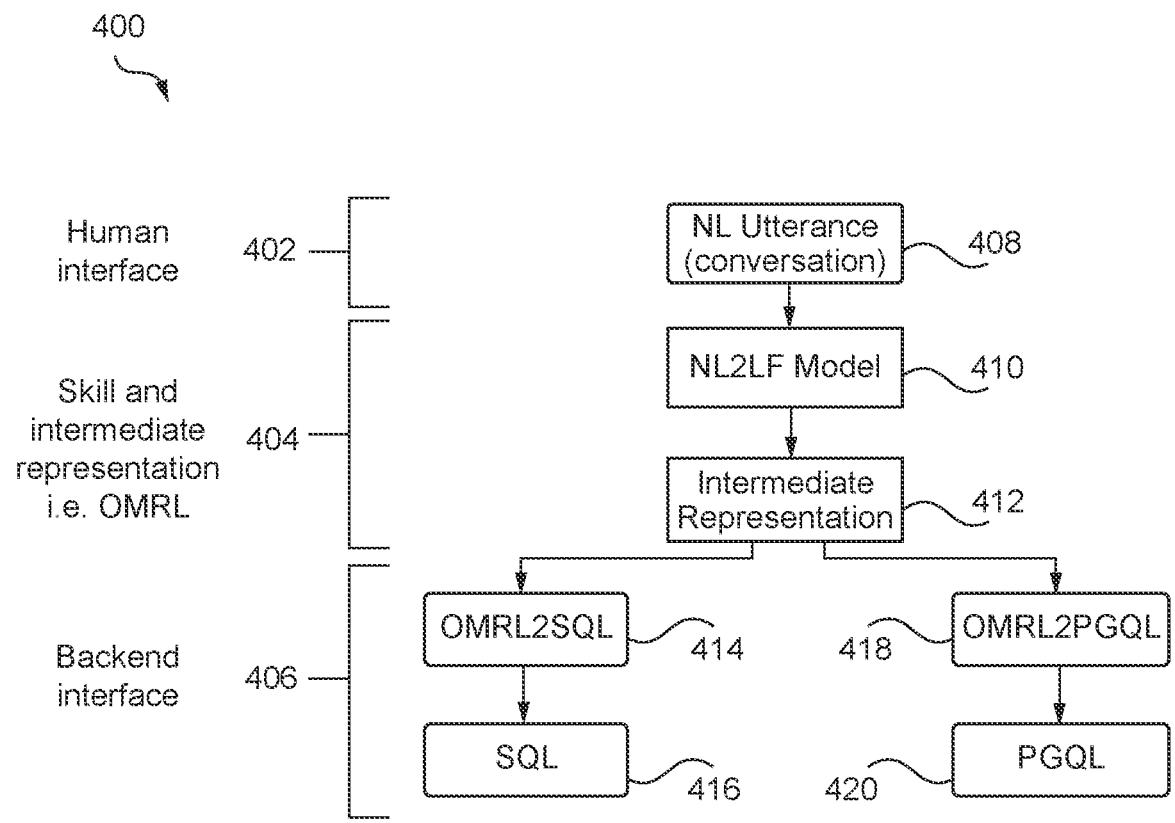
FIG. 4 is a simplified block diagram illustrating an overview of a NL2LF or C2MRL architecture and process for generating a query for a backend interface starting with a natural language utterance, in accordance with various embodiments.

FIG. 4 is a block diagram 400 illustrating an overview of a C2MRL architecture and process for generating a query for a backend interface 406 starting with a NL utterance 408, e.g., as received via a human interface 402. For example, the human interface 402 can be a chatbot system that receives spoken speech and translates it to a text utterance, as described above, or a system where a user types in a request in natural language, or other suitable interfaces. The NL utterance 408 can be in the form of part of a conversation (e.g., "Hello, can you tell me how many orders we need to send out tomorrow?" or "Search for all employees with first name starting with 'S' and living in California.").

The NL utterance 408 is provided to a NL2LF model 410, which converts the NL utterance 408 to an intermediate representation 412 (e.g., MRL or OMRL). The NL2LF model 410 is a machine learning model trained to generate intermediate representations 412 from NL utterances 408. The NL2LF model 410 includes multiple layers and algorithms for generating intermediate representations 412 from NL utterances 408, as described herein in further detail. In some instances, as depicted in FIG. 4, the NL2LF model 410 is a C2OMRL model for converting a conversational utterance to OMRL 412. The NL2LF model 410 may be described interchangeably herein with C2OMRL, although it should be understood that the techniques described herein can be applied to models configured to generate other intermediate representation 412 formats. The intermediate representation 412 is a logical representation of the utterance, which is configured to be translatable into a specific system query language. In some examples, the intermediate representation 412 is OMRL, an intermediate database query language with a specialized schema and interface specification. The intermediate representation 412 may be described interchangeably herein with OMRL, although it should be understood that the techniques described herein can be applied to other intermediate representation 412 formats.

The intermediate representation 412 can then be translated to one or more desired system query languages, such as SQL 416 or PGQL 420, using one or more system language translation processes, such as an OMRL2SQL 414 translation process or an OMRL2PGQL 418 translation process. The translated query (e.g., SQL 416 or PGQL 420) represents the concepts that are present in intermediate representation 412 in a manner that conforms to the requirements of the applicable system query language.

Figure 5:
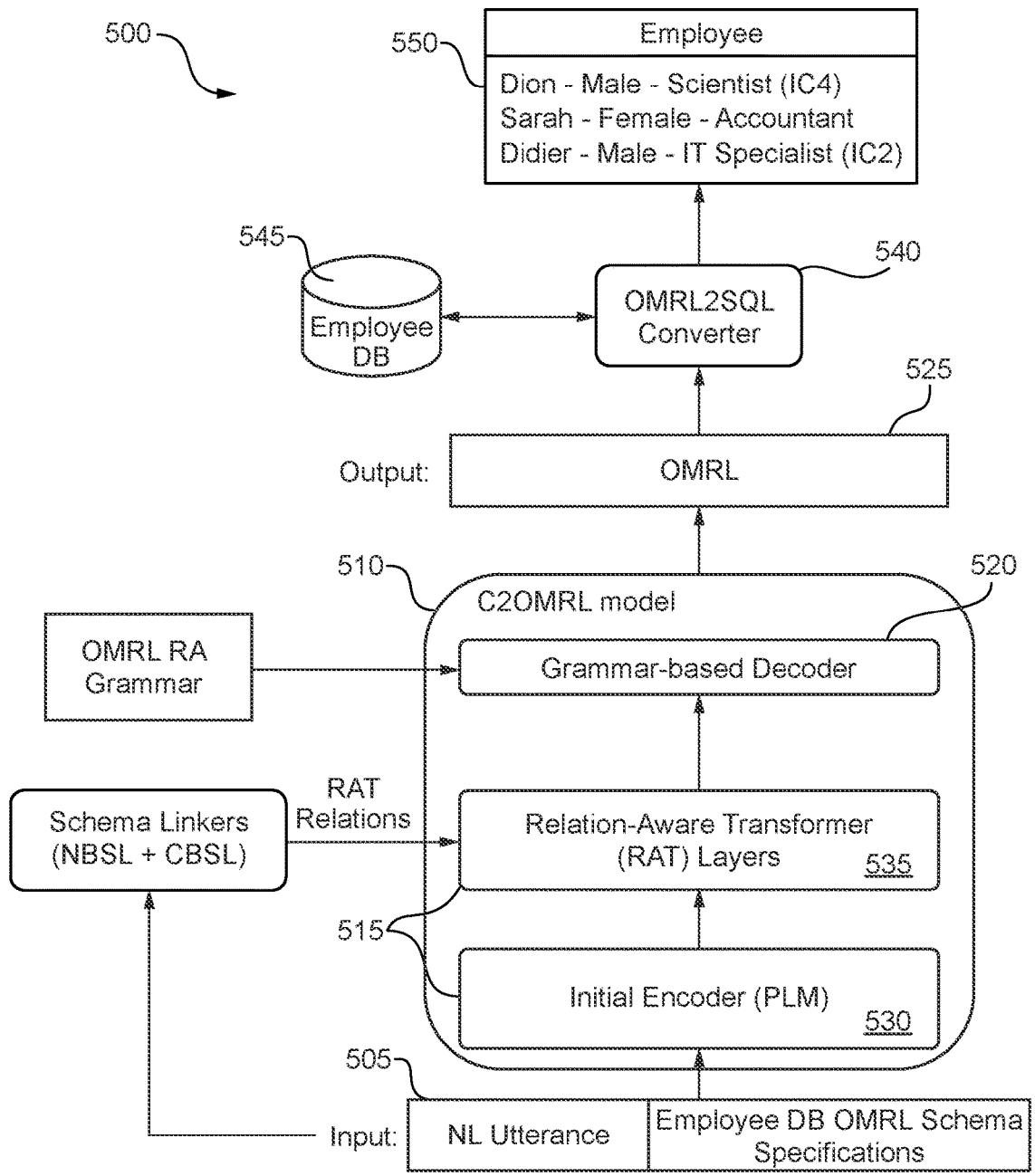
FIG. 5 is a simplified block diagram of a C2OMRL architecture in accordance with various embodiments.

FIG. 5 shows a C2OMRL system 500 powered by a machine learning model to be able to convert a NL utterance (e.g., an utterance within the Digital Assistant platform as described with respect to FIGS. 1-3) into a LF statement such as OMRL query or command, which in turn can be executed for querying an existing system such as a relational database. This machine learning model (referred to herein as the "C2OMRL semantic parser" or "C2OMRL model" or simply "parser") is trained on hundreds to thousands of annotated example pairs (natural language and logical form pairs) for translating NL utterance into a LF statement. As shown, an example 505 (concatenation of a natural language utterance and the database schema, e.g., sequence of table and column names) is input into the C2OMRL model 510. The example 505 is first processed by the encoder component 515, which captures the representation of the natural language utterance and the database schema contextually. The decoder 520 then receives the encoded input and predicts the logical form 525 (e.g., OMRL, which is a SQL-like query) based on the captured representation of the natural language utterance and the database schema.

In the C2OMRL model 510, the encoder component 515 includes two encoders (1) a first encoder, which is a Pre-trained Language Model (PLM) 530; and (2) a second encoder, which is a Relation-Aware Transformer (RAT) 535. The PLM 530 is used to embed the natural language utterance and database schema, as it captures a representation of the natural language utterance and the database schema contextually. In certain instances, a transformer-based PLM called Decoding-enhanced BERT with disentangled attention (DeBERTa) is used as the PLM 530. (See He et al., DeBERTaV3: Improving DeBERTa using ELECTRA-Style Pre-Training with Gradient-Disentangled Embedding Sharing (2021), the entire contents of which are hereby incorporated by reference for all purposes). Transformer-based PLMs learn universal language representations from large volumes of text data using self-supervised learning and transfer this knowledge to downstream tasks. These models provide good background knowledge to downstream tasks which avoids training of downstream models from scratch. The RAT 535 encodes the relations between entities in the database schema and words in the natural language utterance (these relations are called "schema linking" relations).

The decoder 520 is based on a bottom-up generative process (i.e., the bottom-up generative process generates a tree from left to right), where the final generation output is a OMRL tree (i.e., a tree-based structure that represents the full OMRL logical form) that can be mapped to a final OMRL logical form 525. The bottom-up generative process is implemented using a beam search, which is a heuristic search algorithm that explores a graph by expanding the most promising node in a limited set. The beam search works in steps (e.g., −10 steps), also called "beam levels". At each step (e.g., "step i"), the beam search algorithm generates a number F of possible sub-trees for an input sequence that can be obtained by extending the current sub-trees (from step "i−1"), and then selects the top-K sub-trees (known as beam width) for retention using the conditional probability associated with each sub-tree. The conditional probability is referred to herein as a "raw beam score", and thus the top-K intermediate results (to be considered in the next generative step) are the K ones with the highest raw beam scores. Additional information for the bottom-up generative process is found in "Ohad Rubin and Jonathan Berant. 2021. SmBoP: Semi-autoregressive Bottom-up Semantic Parsing, in Proceedings of the 2021 Conference of the North American Chapter of the Association for Computational Linguistics: Human Language Technologies, pages 311-324, Online. Association for Computational Linguistics," the entire contents of which are hereby incorporated by reference for all purposes. The final decoder 520 output is the sub-tree with the highest raw beam score at the last step N.

For example, at a first step (beam level 1), the encoded input utterance and database schema are input to the decoder 520 and the decoder 520 will apply a softmax function to all the tokens in a vocabulary or grammar to find the best alternatives for a first sub-tree (e.g., a first token or node of a tree). To generate the number F of possible sub-trees (known as the frontier), the decoder 520 makes predictions representing the conditional probability of each token in the vocabulary or grammar coming next in a sequence (the likely value of yi+1, conditioned on the previous tokens $y_1, \ldots, y_i$ and the context variable c, produced by the encoder to represent the input sequence). The vocabulary or grammar is obtained from a corpus comprising words or terms in the target logical form (e.g., OMRL). In certain instances, the corpus further comprises rules for the words or terms in the target logical form. The rules define how the words or terms may be used to create a proper phrase or operation in the target logical form (e.g., the combination of terms that work together for a proper OMRL query). The beam search algorithm then selects the top-K sub-trees with the highest conditional probability or raw beam score as the most likely possible choices for the time step. In this example, suppose the top-K sub-trees or beam width is 2 and that the sub-trees with the highest conditional probabilities $P(y_1|c)$ in the first step are sub-tree_1 and sub-tree_12. The top-K results can be a selectable and/or optimizable hyperparameter. Sub-tree_1 and sub-tree_12 and the corresponding conditional probabilities or raw beam scores are saved in memory.

At a second step (beam level 2), the two selected trees (sub-tree_1 and sub-tree_12) from the first step are input to the decoder 520 and the decoder 520 will apply the softmax function to all the tokens in the vocabulary or grammar to find the two best alternatives for the second sub-tree (e.g., a first and second token or node of a tree). While doing this, the beam search algorithm will determine the combination of the first and second tokens or nodes that are most likely to form a pair or second sub-tree using the conditional probabilities. In other words, for all $y_2 \in Y$, the beam search algorithm computes $P(sub\text{-}tree\_1, y_2|c)=P(sub\text{-}tree\_1|c)P(y_2|sub\text{-}tree\_1,c)$, $P(sub\text{-}tree\_12, y_2|c)=P(sub\text{-}tree\_12|c)P(y_2|sub\text{-}tree\_12,c)$, and select the largest two among these values, for example $P(sub\text{-}tree\_22|c)$ and $P(sub\text{-}tree\_37|c)$. Sub-tree_22 and sub-tree_37 and the corresponding conditional probabilities or raw beam scores are saved in memory.

At a third step (beam level 3), the two selected trees (sub-tree_22 and sub-tree 37) from the second step are input to the decoder 520 and the decoder 520 will apply the softmax function to all the tokens in the vocabulary or grammar to find the two best alternatives for the third sub-tree (e.g., a first, second, and third token or node of a tree). While doing this, the beam search algorithm will determine the combination of the first, second, and third tokens or nodes that are most likely to form a string or third sub-tree using the conditional probabilities. In other words, for all $y_3 \in Y$, the beam search algorithm computes $P(sub\text{-}tree\_22, y_3|c)=P(sub\text{-}tree\_22|c)P(y_3|sub\text{-}tree\_22,c)$, $P(sub\text{-}tree\_37, y_3|c)=P(sub\text{-}tree\_37|c)P(y_3|sub\text{-}tree\_37,c)$, and select the top-K sub-trees. The top-K sub-trees and the corresponding conditional probabilities or raw beam scores are saved in memory. This process continues until N number of beam levels is completed (this could be an optimized or selected hyperparameter). The final model output is the sub-tree with the highest conditional probability or raw beam score at the last step N (beam level N). The tokens or nodes of this final sub-tree can then be mapped to a final logical form such as OMRL logical form statement 525.

The predicted MRL logical form statement 525 (i.e., the OMRL tree with the highest raw beam score at the last step N) can then be input into a language converter 540 such as (OMRL2SQL) to translate the meaning representation language to a systems language query or command such as SQL, APIs, REST, GraphQL, PGQL, etc. The systems language query or command can then be used to query or execute an operation on a system 545 (e.g., a relational database) and obtain an output 550 as a result of the query or command.

Integrating Named Entity Recognition into the C2OMRL System

Figure 6:
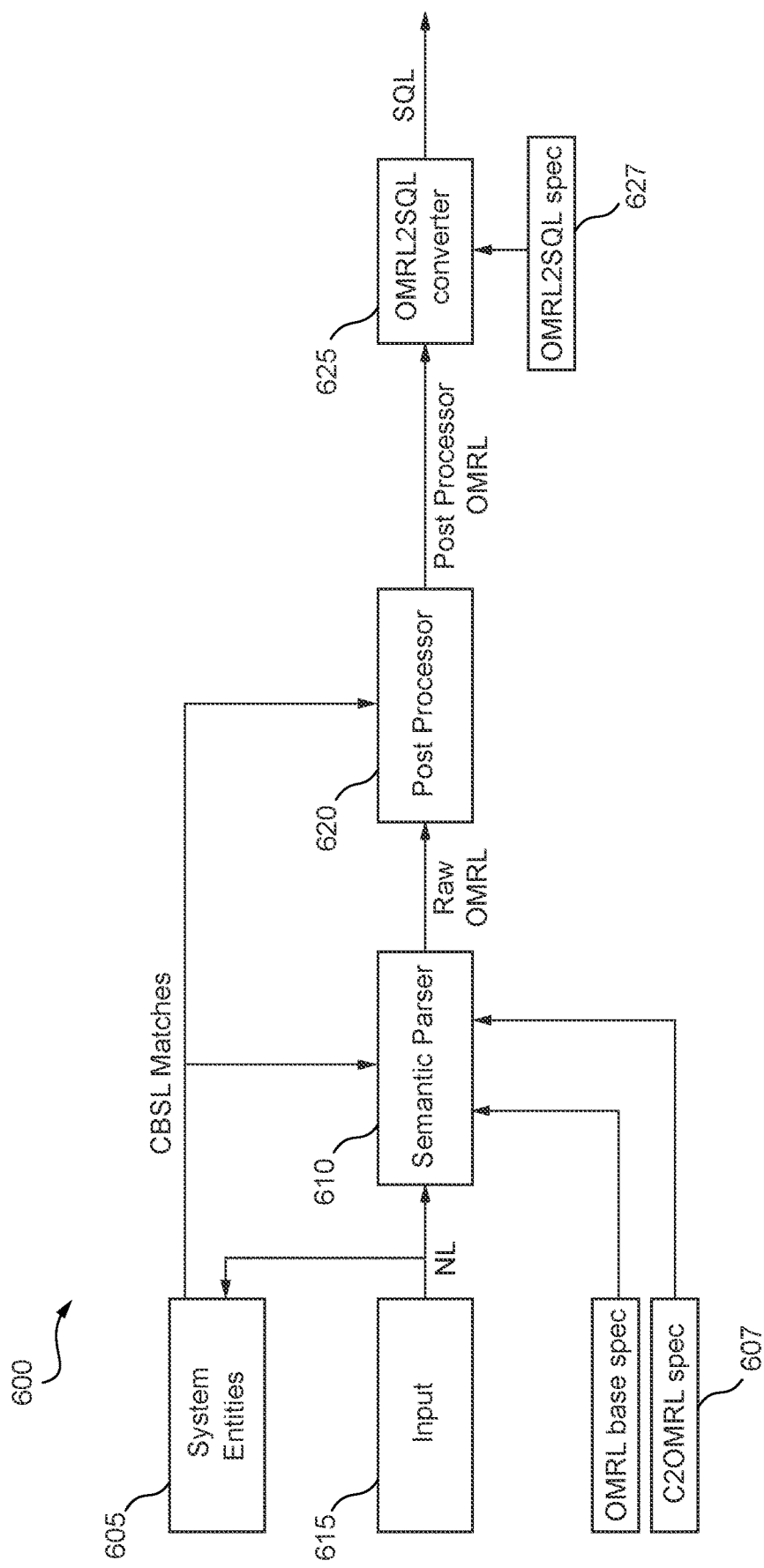
FIG. 6 is a simplified block diagram of a NER and C2OMRL system in accordance with various embodiments.

FIG. 6 shows a block diagram illustrating aspects of a NER and C2OMRL system 600 configured to divide the work between a named entity recognition model 605 and a semantic parser 610 (e.g., the C2OMRL model 510 described with respect to FIG. 5) to process named entity expressions during natural language to logical form translation. At a high level, the semantic parser 610 handles operators and directionality, while the named entity recognition model 605 handles recognizing and resolving named entity expressions. The NER and C2OMRL system 600 is described in detail below with reference particularly to resolving date/time expressions; however, it should be understood the aspects and techniques described herein could also be applied to other named entities (both individual and hierarchical entities).

Firstly, a natural language text is used as input 615 for the named entity recognition model 605 and a class label (a class representative of an individual or composite named entity label) is predicted for one or more tokens within the natural language text (and optionally the entity hierarchy is determined). In some instances, the named entity recognition model 605 is a pre-trained NER model such as a system entities model and the output are classes of tokens that match a system entity (e.g., DATE, TIME, CURRENCY, LOCATION, etc.). For example, given input 615—"Show me the events happening on August $5^{th}$", the named entity recognition model 605 is trained to recognize August $5^{th}$ as a potential named entity and match it to the systems entity DATE (i.e., classify August $5^{th}$ as systems entity: DATE). Additionally, the named entity recognition model 605 (or a subsystem or service downstream of the model) resolves August $5^{th}$ into a standard format for the systems entity: DATE, which could be 2022-08-05. The standard format can be predefined by a user (e.g., an administrator) and may pertain to an ISO standard or some other standard developed for a particular logical form or system program language. In some instances, Content Based Schema Linking (CBSL) is used to link a value in the natural language text to an attribute based on its content (see detailed explanation of use of CBSL with respect to FIG. 8). For example, CB SL matches can be an exact value match or NER matches such as numbers or dates. NER matches may be matched to attributes using the attribute's type from the spec data 607 for a database schema.

Secondly, the natural language text is used as input 615 for the sematic parser 610 and the meaning representation language (e.g., OMRL) is predicted based on cues from the natural language text. Prior to processing by the sematic parser 610, the natural language text is combined with spec data 607 for the meaning representation language and/or the database schema (e.g., sequence of table and column names) and the class prediction and resolved standard format value for the named entity from the named entity recognition model 605. The sematic parser 610 extracts features and variables from the natural language text, the spec data, and the class prediction to then predict the one or more operators and format for the meaning representation language. Continuing with the example above, given input 615—"Show me the events happening on August $5^{th}$", the sematic parser 610 is trained to extracts features and variables from this natural language text and generate a MRL logical form statement=select*from events where event date='August $5^{th}$' that includes a value or value span for the natural language input attribute of August $5^{th}$. This is considered a raw MRL logical form statement.

As shown in the examples in Table 3 below, the semantic parser 610 selects values or value spans for attribute(s) (e.g., attribute(s) of type date or datetime) based on RAT features from the NL (the semantic parser 610 will not resolve a named entity within the natural language text). To help the semantic parser 610 with selecting the values or value spans for attribute(s) such as current date/time value spans from the natural language text for the one or more operators, the semantic parser 610 is informed of the output (e.g., a class label, resolved standard format value, and optionally the entity hierarchy) from the named entity recognition model 605 by adding meaning representation language RAT features for consideration by the semantic parser 610 (see examples in Table 2). The RAT features are similar to a graph having a schema with tokens, entities, and attributes, which are essentially data points in the graph (e.g., the tokens are nodes in the graph), and edges of the graph such as QC-query to column and CQ—column to query for specific types of named entities (e.g., date) match up with the RAT features (QC_date and CQ_date) in order to consume (inform the semantic parser 610) the named entity matches from the named entity recognition model 605. Continuing with the example above, a graph may be constructed to have a schema with a node defined as attribute due_date and nodes defined for the tokens for August $5^{th}$. The schema is further constructed to include two edges (RAT features) that match with the DATE named entity for August $5^{th}$ from the named entity recognition model 605, which are QC_date and CQ_date. The edge QC_date identifies the direction is from August $5^{th}$ to due_date and the edge CQ_date identifies the direction is from due_date to August $5^{th}$. The reason this schema is used is because if an attribute has "date" type and the current natural language tokens (August $5^{th}$) have a match type with DATE_TIME.DATE, then each of those tokens should have QC_DATE/CQ_DATE RAT relations with that attribute.

If the semantic parser output has a value or value span that matches the prediction of the named entity recognition model 605, then thirdly a post-processor 620 (e.g., the post-processor 780 described with respect to FIG. 7) will process the meaning representation language and convert the natural language text for the value or value span to the resolved format (e.g., resolved date/time), as shown in the examples within Table 3 (e.g., if it is an INTERVAL entity, the post-processor will convert its values to "BETWEEN date_1 and date 2" (see Examples 2 and 3 in Table 3)). Continuing with the example above, given input 615—"Show me the events happening on August $5^{th}$", the post-processor 620 is configured to compare the raw MRL logical form statement—select*from events where event date='August $5^{th}$' to the August $5^{th}$ classified as systems entity: DATE from the named entity recognition model 605, determine a match, and replace the August $5^{th}$ in the raw MRL logical form statement with the resolved value—2022-08-05 to generate a post-processed MRL logical form statement—select*from events where event date='2022-08-05'.

Lastly, the converter 625 (e.g., the OMRL2SQL converter 540 described with respect to FIG. 5) consumes these values in the resolved formats (e.g., the post-processed MRL) and converts them to the appropriate format for a systems language such as SQL.

TABLE 2

| Attribute Type | CBSL Match Type | Proposed RAT Feature | Justification |
|---|---|---|---|
| date | DATE_TIME.DATE | QC_DATE<br>CQ DATE | If an attribute has "date" type and the current NL tokens have CBSL match type with DATE_TIME.DATE, then each of those NL tokens will have QC_DATE/CQ_DATE RAT relations with that attribute. |
| | DATE_TIME.DATETIME | QC_DATE<br>CQ_DATE | If an attribute has "date" type and the current NL tokens have CBSL match type with DATE_TIME.DATETIME.DATE, then each of those NL tokens will have QC_DATE/CQ_DATE RAT relations with that attribute. |
| | DATE_TIME.INTERVAL | QC_INTERVAL_START/<br>QC_INTERVAL_END<br>CQ_INTERVAL_START/<br>CQ_INTERVAL_END | If an attribute has "date" type and the current NL tokens have CBSL match type with DATE_TIME.INTERVAL, then each of those NL tokens in the CBSL field DATE_TIME.startDate.originalString will have QC_INTERVAL_START/CQ_INTERVAL_START RAT relations with that attribute.<br>each of those NL tokens in the CBSL field DATE_TIME.endDate.originalString will have QC_INTERVAL_END/CQ_INTERVAL_END RAT relations with that attribute.<br>if INTERVAL is singular such as last month/last week/. . . , then we use QC_INTERVAL/CQ_INTERVAL RAT relations instead.<br>*** Note that:<br>RA operators (<=, >=) are expected to be activated. |
| | DATETIME_DURATION | QC_DURATION<br>CQ_DURATION | If an attribute has "datetime" type and the current NL tokens have CBSL match type with DATE_TIME.DURATION, then each of those NL tokens will have QC_DURATION/CQ_DURATION RAT relations with that attribute.<br>*** Note that:<br>In this case, we introduce a new RA operator called OCCUR to tackle these usecases. |
| datetime | DATE_TIME.TIME | QC_TIME<br>CQ_TIME | If an attribute has "datetime" type and the current NL tokens have CBSL match type with DATE_TIME.TIME, then each of those NL tokens will have QC_TIME/CQ_TIME RAT relations with that attribute. |
| | DATE_TIME.DATETIME | QC_DATETIME<br>CQ_DATETIME | If an attribute has "datetime" type and the current NL tokens have CBSL match type with DATE_TIME.DATETIME, then each of those NL tokens will have QC_DATETIME/CQ DATETIME RAT relations with that attribute. |
| | DATE_TIME.INTERVAL | QC_INTERVAL_START/<br>QC_INTERVAL_END<br>CQ_INTERVAL_START/<br>CQ_INTERVAL_END | If an attribute has "datetime" type and the current NL tokens have CBSL match type with DATE_TIME.INTERVAL, then each of those NL tokens in the CBSL field DATE_TIME.startDate.originalString will have QC_INTERVAL_START/CQ_INTERVAL_START RAT relations with that attribute.<br>each of those NL tokens in the CBSL field DATE_TIME.endDate.originalString will have QC_INTERVAL_END/CQ_INTERVAL_END RAT relations with that attribute.<br>if INTERVAL is singular such as last month/last week/. . . , then we use QC_INTERVAL/CQ_INTERVAL RAT relations instead.<br>*** Note that:<br>RA operators (<=, >=) are expected to be activated. |
| | DATETIME_DURATION | QC_DURATION<br>CQ_DURATION | If an attribute has "datetime" type and the current NL tokens have CBSL match type with DATE_TIME.DURATION, then each of those NL tokens will have QC_DURATION/CQ_DURATION RAT relations with that attribute.<br>*** Note that:<br>In this case, we introduce a new RA operator called OCCUR to tackle these usecases. |

TABLE 3

| NL | System entities matches | Semantic parser raw output | Post processed output |
|---|---|---|---|
| 1 Show me the events happening on August 5th | DATE: August 5th resolvedValue: 2022-08-05 | select * from events where event_date = 'August 5th' | select * from events where event_date = '2022-08-05' |
| 2 Show me the events happening between 5th and 10th august | INTERVAL: 5th august and 10th august resolved Value: 2022-08-05T00:00:00Z/2022-08-10T23:59:59Z | select * from events where event date BETWEEN '5th august' AND '10th august' | select * from events where event_date BETWEEN '2022-08-05T00:00:00Z' and '2022-08-10T23:59:59Z' |
| 3 Show me the events that happened last year | INTERVAL: last year resolved Value: 2022-01-01T00:00:00Z/2022-12-31T23:59:59Z | select * from events where event_date = 'last year' | select * from events where event date BETWEEN '2022-01-01T00:00:00Z' and '2022-12-31T23:59:59Z' |
| 4 Invoices due today | DATE: today resolvedValue: 2022-02-21 | select * from invoices where due_date = 'today' | select * from invoices where due_date = '2022-02-21' |
| 5 Invoices due after today | DATE: today resolved Value: 2022-02-21 | select * from invoices where due date > 'today' | select * from invoices where due_date > '2022-02-21' |
| 6 Invoices that were due last Friday | DATE: last Friday resolvedValue: 2022-02-18 | select * from invoices where due_date = 'last Friday' | select * from invoices where due_date_past = '2022-02-18' |
| 7 Invoices that were due on Friday | DATE: Friday resolvedValue: 2022-02-25 | select * from invoices where due_date_past= 'Friday' | select * from invoices where due_date_past = '2022-02-18' |
| 8 Invoices that are due on Friday | DATE: Friday resolvedValue: 2022-02-25 | select * from invoices where due_date_past= 'Friday' | select * from invoices where due_date_past = '2022-02-25' |
| 9 Invoices that are due after atleast 3 days | DURATION: 3 days resolvedValue: P3D | select * from invoices where due_date_future > '3 days' | select * from invoices where due_date_future >= '2022-02-23' |
| 10 Invoices due in the next 5 days | DURATION: 5 days resolved Value: P5D | select * from invoices where due_date_future INTERVAL '5 days' | select * from invoices where due_date future BETWEEN '2022-02-20T00:00:00Z' and '2022-02-25T23:59:59Z' |

NL2LF with NER Training and Deployment System

Figure 7:
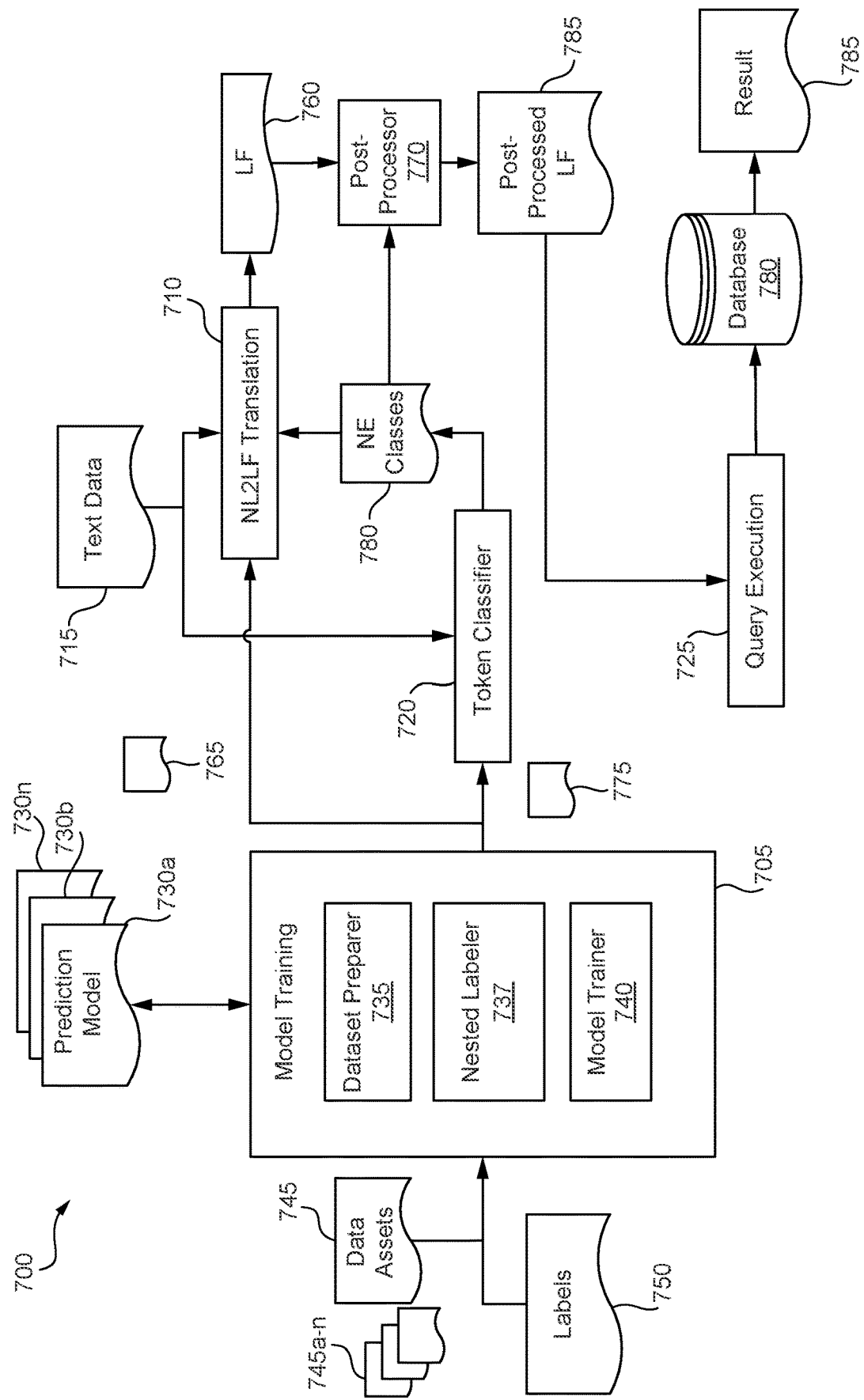
FIG. 7 is a simplified block diagram of a model system for training and deploying models in accordance with various embodiments.

FIG. 7 shows a block diagram illustrating aspects of a model system 700 configured to for training and deploying machine learning models (e.g., the named entity recognition model and a semantic parser described with respect to FIGS. 4-6). The model system 600 in this example includes various stages: a training stage 705 to train machine learning models, a NL2LF translation stage 710 to translate natural language text 715 (e.g., an utterance) to a logical form such as OMRL, a token classifier stage 720 to recognize and resolve named entity expressions within the natural language text 715, and a query execution stage 725 to execute the logical form on a system such as database to obtain a result (e.g., an answer to a query within an utterance). The training stage 705 builds and trains one or more machine learning models 730a-730n ('n' represents any natural number) to be used by the other stages (which may be referred to herein individually as a model 730 or collectively as the models 730). For example, the models 730 can include a first model for translating a natural language text to a logical form, a second model for recognizing and extracting named entities from a natural language text, and third model for translating the logical form to a particular system query language. Still other types of prediction models (e.g., an intent classifier) may be implemented in other examples according to this disclosure.

A model 730 may be a deep learning model, such as a convolutional neural network ("CNN"), e.g., an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier. A model 730 can also be any other suitable machine learning model trained for classification or natural language processing, understanding, or generating, such as a Logistic regression Classifier, a Naive Bayes Classifier, a Linear Classifier, Support Vector Machine, Bagging Models such as Random Forest Model, Boosting Models, Shallow Neural Networks, a Transformer such as Bidirectional Encoder Representations from Transformers (BERT), or combinations of one or more of such techniques—e.g., CNN-HMI or MCNN (Multi-Scale Convolutional Neural Network). The model system 700 may employ the same type of model or different types of models for various tasks such as translating natural language to logical forms, named entity recognition, and/or classification.

In some embodiments, a model 730 is configured as a sematic parser or NL2LF model such as RAT-SQL, DuoRAT, a Grammar-Augmented Pre-Training model (GRAPPA) for Table Semantic Parsing, RAT-SQL+ GRAPPA, RoBERTa, Semi-autoregressive Bottom-up Semantic Parsing model (SMBOP), or the like. Additional information for the RAT-SQL model is found in "RAT-SQL: Relation-Aware Schema Encoding and Linking for Text-to-SQL Parsers" by Wang et al., published in Proceedings of the 58th Annual Meeting of the Association for Computational Linguistics, the entire contents of which are hereby incorporated by reference for all purposes. Additional information for the DuoRAT model is found in "DuoRAT: Towards Simpler Text-to-SQL Models" by Scholak et al., published in Proceedings of the 2021 Conference of the North American Chapter of the Association for Computational Linguistics, the entire contents of which are hereby incorporated by reference for all purposes. Additional information for the SMBOP model is found in Ohad Rubin and Jonathan Berant. 2021. "SmBoP: Semi-autoregressive Bottom-up Semantic Parsing." In Proceedings of the 2021 Conference of the North American Chapter of the Association for Computational Linguistics: Human Language Technologies, pages 311-324, Online. Association for Computational Linguistics, the entire contents of which are hereby incorporated by reference for all purposes.

To train the various models 730, the training stage 705 is comprised of two main subsystems or services: dataset preparer 735, nested labeler 737, and model trainer 740. The dataset preparer 735 facilitates the process of loading data assets 745, splitting the data assets 745 into training and validation sets (745-a-n) so that the system can train and test the models 730, and performing basic natural language pre-processing (e.g., standardization, normalization, tokenizing data, annotation, augmentation, embedding, etc.). The data assets 745 include natural language utterances (e.g., natural language questions/requests) obtained from one or more sources such as from human annotators (e.g., Spider, SParC, and/or CoSQL datasets), a database (not shown), a computing system (e.g., data preprocessing subsystem), or the like. In some instances, the utterances are provided by a client or customer. In other instances, the utterances are automatically generated and/or retrieved from libraries of utterances (e.g., identifying utterances from a library that are specific to a task that a model is to learn). The data assets 745 can include input text or audio (or input features of text or audio frames) and labels 750 corresponding to the input text or audio (or input features) as a matrix or table of values. For example, for each utterance, a corresponding label may comprise an indication of the corresponding logical form (e.g., statements/queries such as OMRL queries), an indication of the correct token classification (e.g., named entity class such as PERSON, CURRENCY, DATE, or DATE-TIME) to be inferred, and the like. The behavior of the model can then be adapted (e.g., through back-propagation) to minimize the difference between the generated inferences and the ground truth information. For example, the data assets 745 can include the natural language utterance "What is the average life expectancy in the United States of America?" and a label including the corresponding logical form "SELECT AVG(life expectancy) FROM country=United States of America" (and in some instances whether the predicted logical form was "correct" or "incorrect").

In some instances, the data assets 745 also include database schema information. A database schema defines how data is organized within a database such as a relational database; this includes logical constraints such as table names, fields, data types, and the relationships between these entities. A relational database can be formed of one or more tables with each table of the one or more tables including one or more columns with each column of the one or more columns including one or more values. Each table and column of a relational database can be named with unique identifiers, each of which can include one or more words. In some instances, one or more columns of the relational database may serve as a primary key in which each of the values of the one or more columns that serve as the primary key are unique from each other. In some instances, one or more columns of the relational database may serve as a foreign key which serves to the link the table which includes the one or more columns with another table in the relational database. In some instances, the database schema information includes one or more data structures for storing the unique identifiers of the one or more tables, the unique identifiers of the one or more columns, and values of each relational database. The unique identifiers and values can be stored by the dataset preparer 735 in one or more vectors and/or matrices. In some embodiments, a data structure storing schema information for a relational database can store a directed graph representing the unique identifiers and values.

In some instances, the data assets 645 also include beam score information. Beam score information of one or more beam levels may be obtained from the decoder of a trained NL2LF machine learning model (e.g., the C2OMRL model 510 described with respect to FIG. 5). The raw beam scores of one or more beam levels are preprocessed by the dataset preparer 735 to generate a vector of the raw beam scores of one or more beam levels. The vector comprises a stack or sequence arrangement of the raw beam scores. The beam score information may be annotated with a ground truth label for whether the trained NL2LF machine learning model correctly or incorrectly predicted the LF given a certain NL utterance. This label may be generated by comparing the LF output from the trained NL2LF machine learning model to the LF ground truth established for the utterance and determining whether the LF output is the same or substantially the same as the LF ground truth established for the utterance.

Once the data assets 745 are obtained, the datasets may be split into training and validation datasets. The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. Before or after splitting, basic natural language pre-processing may be performed on the data assets 745. In some instances, the pre-processing includes tokenizing the utterances of the data assets 745. Tokenizing is splitting a phrase, sentence, paragraph, or an entire text document into smaller units, such as individual words or terms. Each of these smaller units are called tokens. Smaller units are created by locating boundaries such as word boundaries, which are the ending point of a word and the beginning of the next word. For example, the text "How many employees work for company X" can be word tokenized into 'How', 'many', 'employees', 'work', 'for', 'company', 'X'. These tokens help the model to understand the context and develop the model for a given task. There are various tokenization techniques which can be used for executing the tokenizing based on the language and modeling task. For example, the tokenizing may be performed using Natural Language ToolKit, white space tokenization, dictionary-based tokenization, rule-based tokenization, Keras tokenization, Penn Tree based tokenization, spaCy tokenization, Moses tokenization, subword tokenization, or the like.

In some instances, the tokens for data assets 745 may then be embedded to word embeddings (e.g., contextualized word embeddings). A word embedding is a learned representation for text where words that have the same meaning have a similar representation. Word embeddings are generated by embedding techniques where individual words are represented as real-valued vectors in a predefined vector space so they can be understood by deep learning algorithms. The embedding techniques can be joint or individual embedding techniques such as including an embedding layer within the deep learning algorithm or using a separate model such as a BERT-based pretrained language model (e.g., BERT, RoBERTa, and DeBERTa). BERT-based models are pretrained language models that use self-supervised learning to learn the deep meaning of words and contexts. An embedding layer is a word embedding that is learned jointly with a neural network model on a specific natural language processing task, such as the natural language to logical form translation (e.g., the natural language-logical form (NL-LF) algorithm(s)). In some instances, word embedding techniques can be used such as Word2Vec or GloVe. Word2Vec is a statistical technique that uses a model such as Continuous Bag-of-Words or Continuous Skip-Gram Model for learning a standalone word embedding from a text corpus. GloVe, for Global Vectors, is a model for creating word embeddings based on the global corpus statistics. It is trained on the non-zero entries of a global word-word co-occurrence matrix, which tabulates how frequently words co-occur with one another in a given corpus. In NER having knowledge of context is can be important which may not be achieved by traditional word embeddings such as (GloVe, fasttext, Word2Vec etc.). Consequently, in some instances, contextualized word embedding techniques can be used such as Embeddings from Language Models (ELMO), Multilayer Perceptron classifier (MLP), Bidirectional RNN, CNN, transformers, and the like.

The nested labeler 737 generates the new labels for tokens (i.e., those to be classified as named entities) extracted from examples of the training data 745a by concatenating the original labels 750 assigned to a token into a single class label. For example, words or tokens within the training data 745a to be classified as name entities may be labeled with labels 750 that support a nested labelling scheme (e.g., the word or token "Monday" can be assigned both named entity labels DATETIME and DATE). The nested labeler 737 combines the labels 750 into a concatenated or composite label as a sequence of the labels 750. Consequently, during training, the model 725 treats the concatenated label as a single label for purposes of learning. For example, the nested labeler 737 combines the labels DATETIME and DATE for token "Monday" into DATETIME|DATE. Similarly, for the token "3 PM", the nested labeler 737 combines the labels DATETIME and TIME for token "3 PM" into DATETIME|TIME. In some instances, it should be understood that the labels 750 and/or the concatenated labels may include additional information such as BIO/IOB (short for inside, outside, beginning) tags for tagging tokens to provide location information (e.g., I-RECURRING|I-INTERVAL|B-TIME|B-START). The nested labeler 735 may be implemented manually by a user or automatically using software, hardware, or a combination of software and hardware to generate modified training data 745a comprising examples labeled with one or more concatenated or composite labels, as described in further detail herein. The original labels 750 and the concatenated labels effectively define the classes of named entities available for the model 730 to learn and classify tokens as recognized named entities (nonhierarchical and hierarchical).

Consequently, a model trained using the nest labeling approach will be able to predict the concatenated single label which comprises not only the parent class but also any subclasses for a token recognized as a named entity. Table 4 shows example predictions by a model trained using the nested labeling approach (following prediction a post-processing step is performed to extract the entity hierarchy from the concatenated single label described in further detail below).

TABLE 4

Model Prediction

```
{
    "originalString": "3 pm on Monday",
    "raw predictions:"
    [
        {
            "3" : B-DATETIME|B-TIME,
            "pm": "I-DATETIME|I-TIME"
            "on" : I-DATETIME,
            "Monday": "I-DATETIME|B-DATE"
        },
    ]
}
{
    "originalString": "every Tuesday 3 - 4 pm",
    "raw predictions:"
    [
        {
            "every" : B-RECURRING,
            "Tuesday": I-RECURRING|B-INTERVAL|B-DATE|B-START
            "3" : I-RECURRING|I-INTERVAL|B-TIME|B-START,
            "—": I-RECURRING|I-INTERVAL,
            "4": I-RECURRING|I-INTERVAL|B-TIME|B-END,
            "PM" : I-RECURRING|I-INTERVAL|I-TIME|I-END
        },
    ]
}
```

The model trainer 740 performs the processes of determining hyperparameters for the model 730 and performing iterative operations of inputting examples from original and/or modified training data 745a into the models 730 to find a set of model parameters (e.g., weights and/or biases) that minimizes an objective function(s) such as loss or error function for the models. The modified training data 745a may be modified as described with respect to concatenated or composite labels, augmented or supplemental training data, or a combination thereof. The hyperparameters are settings that can be tuned or optimized to control the behavior of the model 730. Most models explicitly define hyperparameters that control different aspects of the models such as memory or cost of execution. However, additional hyperparameters may be defined and optimized to adapt a model to a specific scenario. For example, the hyperparameters may include the number of hidden units of a model, the learning rate of a model, the convolution kernel width, the number of kernels for a model, the top-K results, N number of beam levels, and the like.

During training by the model trainer 740, error is calculated as the difference between the actual output (e.g., as indicated by the label 750) and the predicted output (e.g., as determined by the model 730). The function that is used to compute this error is known as an objective function (e.g., a loss function or a cost function). Error is a function of internal parameters of the model, e.g., weights and bias. For accurate predictions, the error needs to be minimized. In order to minimize the error, the model parameters are incrementally updated by minimizing the objective function over the training examples from preprocessed data assets 745. The objective function can be constructed to measure the difference between the outputs inferred using the models and the ground truth annotated to the samples using the labels. For example, for a supervised learning-based model, the goal of the training is to learn a function "h( )" (also sometimes referred to as the hypothesis function) that maps the training input space X to the target value space Y, h:

X→Y, such that h(x) is a good predictor for the corresponding value of y. Various different techniques may be used to learn this hypothesis function. In some machine learning algorithms such as a neural network, this is done using back propagation. The current error is typically propagated backwards to a previous layer, where it is used to modify the weights and bias values in such a way that the error is minimized. The weights are modified using the optimization function. Optimization functions usually calculate the error gradient, i.e., the partial derivative of the objective function with respect to weights, and the weights are modified in the opposite direction of the calculated error gradient. For example, techniques such as back propagation, random feedback, Direct Feedback Alignment (DFA), Indirect Feedback Alignment (IFA), Hebbian learning, and the like are used to update the model parameters in such a manner as to minimize or maximize this objective function. This cycle is repeated until a minimum of the objective function is reached.

In some instances, natural language-logical form (NL2LF) algorithm(s) are trained by model trainer 740 using the preprocessed data assets 745 (e.g., tokenized data assets). In some instances, the NL2LF algorithm(s) comprise an encoder-decoder neural network. The encoder is comprised of an input layer and one or more encoding layers. The one or more encoding layers may include multiple recurrent units such as Long Short-Term Memory (LSTM), where each recurrent unit gets input in the form of a single element of the input sequence, gathering data for that specific element and generating it forward. The encoder follows an embedding procedure to transform the relevant text (and optionally the database schema) into number/vector representation to conserve the conditions and connection between words and sentences, such that a machine can comprehend the pattern associated with any text, make out the context of the sentences, and optionally learn relationships between words and a given database schema. The result of the encoder will be a state vector or context vector. This state vector will be the input for the decoder. The decoder is comprised of an input layer, one or more decoding layers, a dense layer, and an output layer (e.g., a layer with a softmax function). The one or more decoding layers may include multiple recurrent units such as LSTM in which an output for every time step is predicted. The current recurrent unit accepts a hidden state from the earlier recurrent unit. The result of the decoder will be a logical form such as a OMRL query translated from an utterance within the preprocessed data assets 745.

Once a set of model parameters are identified by the model trainer 740, the model 730 has been trained and a validator is configured to validate the model 730 using the validation datasets. The validation process performed by the validator includes iterative operations of inputting the validating datasets into the trained model 730 using a validation technique such as K-Fold Cross-Validation, Leave-one-out Cross-Validation, Leave-one-group-out Cross-Validation, Nested Cross-Validation, or the like to tune the model parameters and ultimately find the optimal set of model parameters. Once the optimal set of model parameters are obtained, a reserved test set of data from the validating datasets are input into the trained model 730 to obtain output, and the output is evaluated versus ground truth values using correlation techniques such as Bland-Altman method and the Spearman's rank correlation coefficients and calculating performance metrics such as the error, accuracy, precision, recall, receiver operating characteristic curve (ROC), etc. In some instances, the obtaining, training, and validating data processes in the model system 700 can be repeatedly performed (adjusted) by the model trainer 740 until a predetermined condition is satisfied and a final set of model parameters can be provided by the model trainer 740.

As should be understood, other training/validation mechanisms are contemplated and may be implemented within the model system 700. For example, the model 730 may be trained and model parameters may be tuned on datasets from a subset of obtained or filtered datasets and the datasets from a subset of obtained or filtered datasets may only be used for testing and evaluating performance of the model 730. Moreover, although the training mechanisms described herein focus on training a new model 730, these training mechanisms can also be utilized to fine tune existing models trained from other datasets. For example, in some instances, a model 730 might have been pre-trained using datasets from one or more different modalities or tasks. In those cases, the models 730 can be used for transfer learning and retrained/validated using the training and validating data as described above.

The training stage 705 outputs a trained model 730 with an optimized set of model parameters for use in the NL2LF translation stage 710 or the token classifier stage 720. The NL2LF translation stage 710 comprises a predictor for translating text data 715 (e.g., a natural language utterance) to a logical form 760 (e.g., OMRL query). For example, the predictor executes processes for inputting input text data 715 into the trained NL2LF model 765, and generating, using the trained NL2LF model 765, a logical form 760 based on features within the text data 715. In some instances, the trained NL2LF model 765 performs one or more semantic parsing tasks to generate the prediction based on the features extracted from the text data 715. The NL2LF translation stage 710 outputs a logical form 760 which can be used by the post processor 770 and the query execution stage 725. The token classifier stage 720 comprises a predictor for recognizing and classifying named entities within the text data 715 (e.g., a natural language utterance). For example, the predictor executes processes for inputting input text data 715 into the NER model 775, and generating, using the trained NER model 775, predictions for named entity classes 780 based on features within the text data 715. In some instances, the trained NER model 775 splits text data 715 into text tokens or spans and regards them as candidate entities; it then directly obtains the types of tokens or spans by conducting entity type classifications on token or span semantic representations to generate the predictions for named entity classes 780. The token classifier stage 720 outputs the entity classes 780 and optionally the entity hierarchy, which can be used by the NL2LF translation stage 710 to help the trained NL2LF model 765 select values or value spans for attribute(s) (e.g., attribute(s) of type date or datetime) based on the RAT features from the text data 715 (the trained NL2LF model 765 will not resolve a named entity within the text data 715).

As shown in FIG. 7, the token classifier stage 720 outputs model predictions to the NL2LF translation stage 710, which in turn outputs logical form 760 to the post-processor 770 (additionally or alternatively the token classifier stage 720 outputs model predictions directly to the post-processor 770). The post-processor 770 is configured to post process the logical form 760 and convert the text data span to the resolved named entity format. For example, if the logical form 760 has a value span that matches the named entity classes 780 from the token classifier stage 720, then the post-processor 770 will post process the logical form 760 and convert the text data span to the resolved named entity format. In the instance the named entity is a hierarchical named entity, the post processing may include extracting and outputting an entity hierarchy from each concatenated label. For example, the model prediction for a token may be directed to a class representing a single named entity label such as CURRENCY, PERSON, DATE, TIME, NUMBER, etc. or a class representing a concatenated named entity label such as DATETIME|TIME, DATETIME|DATE, DATETIME|TIME|DURATION, etc.

In the instance the prediction is a class representing a single label, post-processor 770 converts the text data span to the resolved named entity format for the single named entity label and passes the resolved named entity format through as a final post-processed logical form 785. In the instance the prediction is a class representing a concatenated label, post-processor 770 extracts or disambiguates the hierarchy represented by the concatenated named entity label and then converts the text data span to the resolved named entity format for the hierarchy and passes the resolved named entity format through as a final post-processed logical form 785. For example, the concatenated named entity label DATETIME|DATE and DATETIME|TIME for the tokens 'Thursday at 5 pm' would be disambiguated to named entity DATETIME comprising nested entity DATE for Thursday and TIME for 5 μm. The post-processor 770 extracts or disambiguates the hierarchy (token classes 477) based on a hierarchical template associated with the concatenated named entity label. For example, a matrix or database can be configured to associate the hierarchical templates with concatenated named entity labels such that given a predicted concatenated named entity label the post-processor 770 can use the matrix or database to obtain the associated hierarchical template and use the hierarchical template to extract the hierarchy. The hierarchical template may be defined as in a file format used to store and transmit data objects comprised of attribute—value pairs and arrays such as a JSON object and the nested labels are mapped via the matrix or database to the corresponding data objects.

The query execution stage 725 comprises one or more executors configured for executing the logical form 760 or post-processed logical form 785 on a system such as database 790 to obtain a result 795 (e.g., an answer to a query within natural language utterances(s)). For example, the one or more executors may be configured to translate or convert the meaning representation language for the logical form 760 or post-processed logical form 785 to a systems language query or command such as SQL, APIs, REST, GraphQL, PGQL, etc., and execute the systems language query or command on a relational database to obtain an answer to a query posed in the natural language utterance(s).

While not explicitly shown, it will be appreciated that the model system 700 may further include a developer device associated with a developer. Communications from a developer device to components of the model system 700 may indicate what types of input data, utterances, and/or database schema are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

Techniques for Integrating Named Entity Outputs into a Semantic Parser

Figure 8:
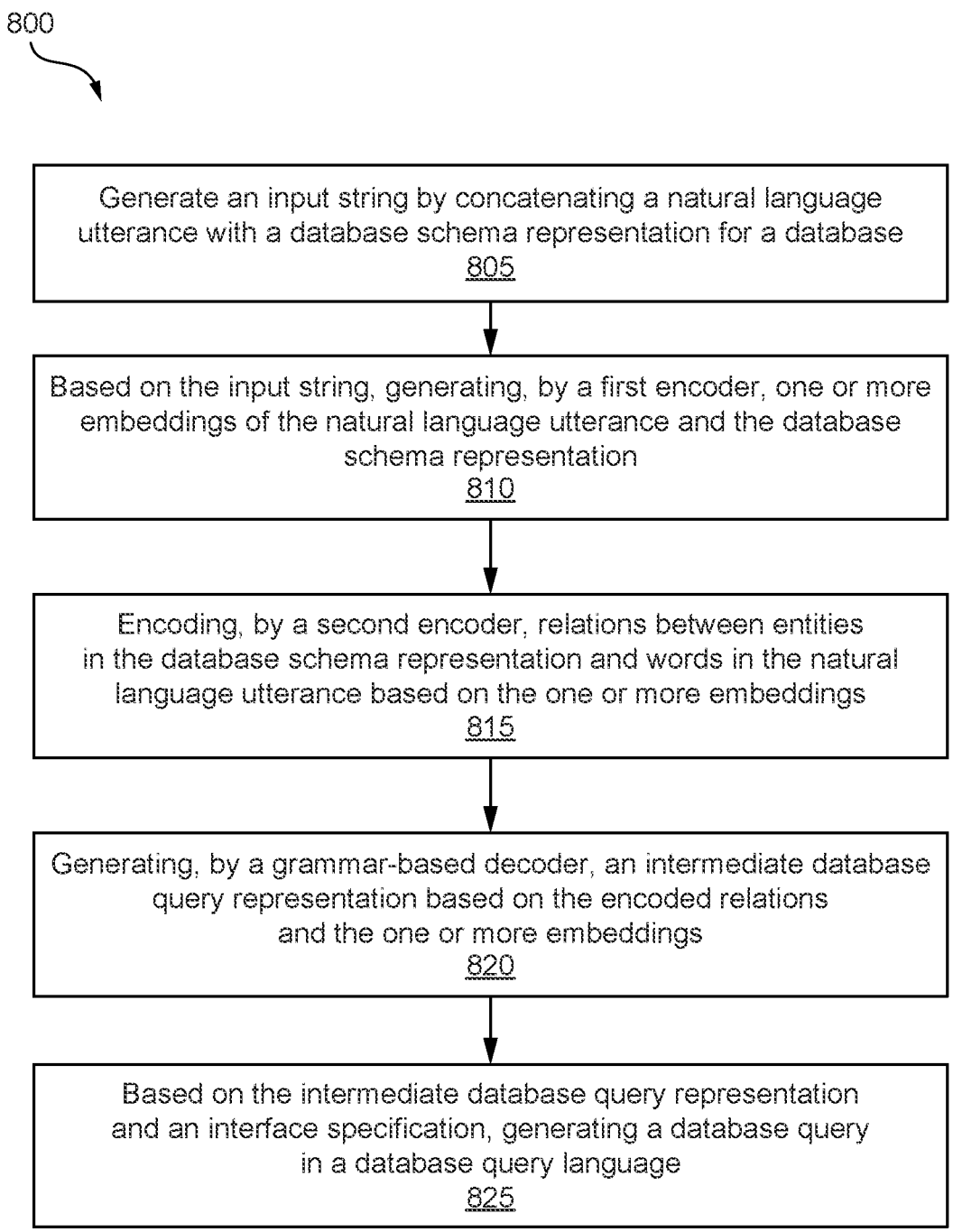
FIG. 8 is a process flow for converting a natural language utterance to a logical form query in accordance with various embodiments

FIG. 8 is a flowchart illustrating a process 800 for converting a natural language utterance to a logical form query in accordance with various embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order, or some steps may also be performed in parallel. In certain embodiments, such as in the embodiments depicted in FIGS. 1-7, the processing depicted in FIG. 9 may be performed by a pre-processing subsystem (e.g., pre-processing subsystem 210 or model system 700) to create, train, update, and deploy one or more machine-learning models configured for translating natural language to logical form.

At step 805, an input string is generated by concatenating a natural language utterance with a database schema representation for a system (e.g., a database). The database schema representation for the system includes information defining how data is organized in the system. This can include information such as table names, fields, data types, and relationships between the table names, fields, and data types. The natural language utterance is a text string, such as "List vendors in order of sales for last month." In some instances, the database schema representation is also in string form.

In some examples, the database schema representation includes table and column names indicating the system to be queried. As a specific example, consider a simple database schema for one table (invoices) having four columns, as shown in Table 5.

TABLE 5

INVOICES

| Invoice number | Supplier | Status | Amount |
| --- | --- | --- | --- |
| 111 | Marcopolo | Paid | $500 |
| 222 | Mary | Approved | $100 |

For the natural language utterance "What are the invoices for supplier Mary," example model input is represented by the following concatenation of NL utterance and DB schema, as shown in Table 6.

TABLE 6

| <s>What are the invoices for supplier Mary</s> | Invoice </s> Invoice num </s> Supplier </s> Amount </s> |
| --- | --- |

Since some databases may relate to completely different sets of words (e.g., one for employee data, one for stock in a department store, one for scientific data etc.), including the schema specification in the input helps the model to contextualize the utterance to the schema.

At step 810, based on the input string, one or more embeddings of the natural language utterance and the database schema representation are generated by a first encoder. The input string is provided as input to the first encoder. In some instances, the first encoder is a Pre-trained Language Model (PLM), as described with respect to FIG. 5. The first encoder processes the input string to generate the one or more embeddings of natural language utterance and the database schema representation. This may be achieved using a single embedding or multiple embeddings. As described above, an embedding is a learned representation for text where words that have the same meaning have a similar representation and embeddings are generated by embedding techniques where individual words are represented as real-valued vectors in a predefined vector space so they can be understood by deep learning algorithms.

At step 815, a second encoder encodes relations between elements in the database schema representation and words in the natural language utterance, based on the generated one or more embeddings. The elements in the database schema can include table names, column names, row names, fields, relationships, views indexes, directories, and/or other database schema elements. The generated one or more embeddings are provided from the first encoder to the second encoder. In some instances, the second encoder is a Relation-Aware Transformer (RAT) as described with respect to FIG. 5. The second encoder includes multiple self-attention layers configured to apply self-attention to the one or more embeddings to identify relations between the entities in the database schema representation and words in the natural language utterance. Use of RATs is described in Wang et al., *RAT-SQL: Relation Aware Schema Encoding and Linking for Text-to-SQL Parsers* (2021), the entire contents of which are incorporated herein by reference full all purposes.

In some instances, schema-linking relations that link elements in the schema representation and words in the natural language utterance are also provided to the second encoder, and the embeddings are further generated based on the schema-linking relations. The schema-linking relations provide information to help the second encoder identify how the elements in the database schema representation relate to the words in the natural language utterance. Schema linking serves to capture latent linking between tokens in utterances and schema (e.g., entities/attributes in OMRL or tables/columns in SQL). The schema linking relations are encoded into layers of the second encoder as prior knowledge.

In some instances, name-based schema linking (NBSL) is applied. NB SL works to produce matching between tokens in the natural language utterance and elements in the database schema representation. NBSL matches entities such as table names and column names to words in the input utterance, which can be based on an exact match or a partial match for both the primary name and its synonyms to elements in the database schema representation.

In some instances, the OMRL schema includes rich metadata. This metadata includes information specifying synonyms for different words. For example, car is a synonym for automobile. Using this rich metadata in the OMRL schema, the name-based schema linking can identify elements in the database schema representation based on identifying synonyms as well as identifying an exact match. In other words, the schema-linking relations comprise metadata specifying synonyms for words. In some instances, the OMRL schema includes link attributes, as described above with respect to step 702.

In some instances, CBSL is applied. In CB SL for OMRL, data assets to be used in a natural language to logical form model are preprocessed based on scalable search and content-based schema linking. The preprocessing techniques combine named entity recognition and scalable searches (e.g., elastic search) to obtain CB SL matches between words or tokens of an utterance and system entities and/or values for attributes within a given database schema. The content-based schema linking matches are appended to the utterance using a unique data structure, and then the data structure is input into the natural language to logical form model. The data structure facilitates encoding and decoding of the input utterance into a logical form by the natural language to logical form model. Advantageously, by using scalable search and content-based schema linking, the natural language to logical form model response time and accuracy can be improved over conventional standardized programming language techniques such as SQL searches on the database using a SQL similarity operator. CB SL techniques are described in further detail in U.S. patent application Ser. No. 18/065,387, entitled "Transforming Natural Language To Structured Query Language Based On Scalable Search And Content-Based Schema Linking," filed Dec. 13, 2022, the entire contents of which are hereby incorporated by reference full all purposes.

At step 820, a grammar-based decoder generates a logical form query (e.g., an intermediate database query representation) based on the encoded relations and the one or more embeddings. As described above with respect to FIGS. 5 and 6, the grammar-based decoder applies a bottom-up generative process using a beam search to generate an OMRL tree that represents the full OMRL logical form. The grammar-based decoder obtains one or more raw beam scores generated from one or more beam levels of the grammar-based decoder. The one or more raw beam scores are used to classify the intermediate database query representation as correct or incorrect.

In some instances, relational algebra (RA) grammar is further provided to the grammar-based decoder. The RA grammar represents the logical form query as a tree. The RA grammar uses configured RA operators to represent the logical form query. The RA grammar is used to control the syntax of the decoder output to ensure that the generated logical form will have proper syntax, which will influence the processing steps later (including execution over existing databases). Thus, the logical form query is further based on the relational algebra grammar. In some instances, specialized RA grammar is adapted for OMRL.

At step 825, based on the logical form query and an interface specification, a database query in a database query language is generated. The interface specification establishes a mapping between the logical form query and a particular target database query language such as SQL. The interface specification can be built into a converter specific to the target database query language such as an OMRL2SQL converter. In some instances, the converter is a model (e.g., a non-deep-learning model) that does not require training.

In some instances, the database query is executed on the database to retrieve data responsive to the natural language utterance from step 805. For example, an SQL query is executed, or a PGQL query is executed, and so forth, depending on the back-end database of interest. As an example, based on initial speech input of "What are the top three earning stores?", a database query is executed to retrieve a list of the three top earning stores from the database.

Figure 9:
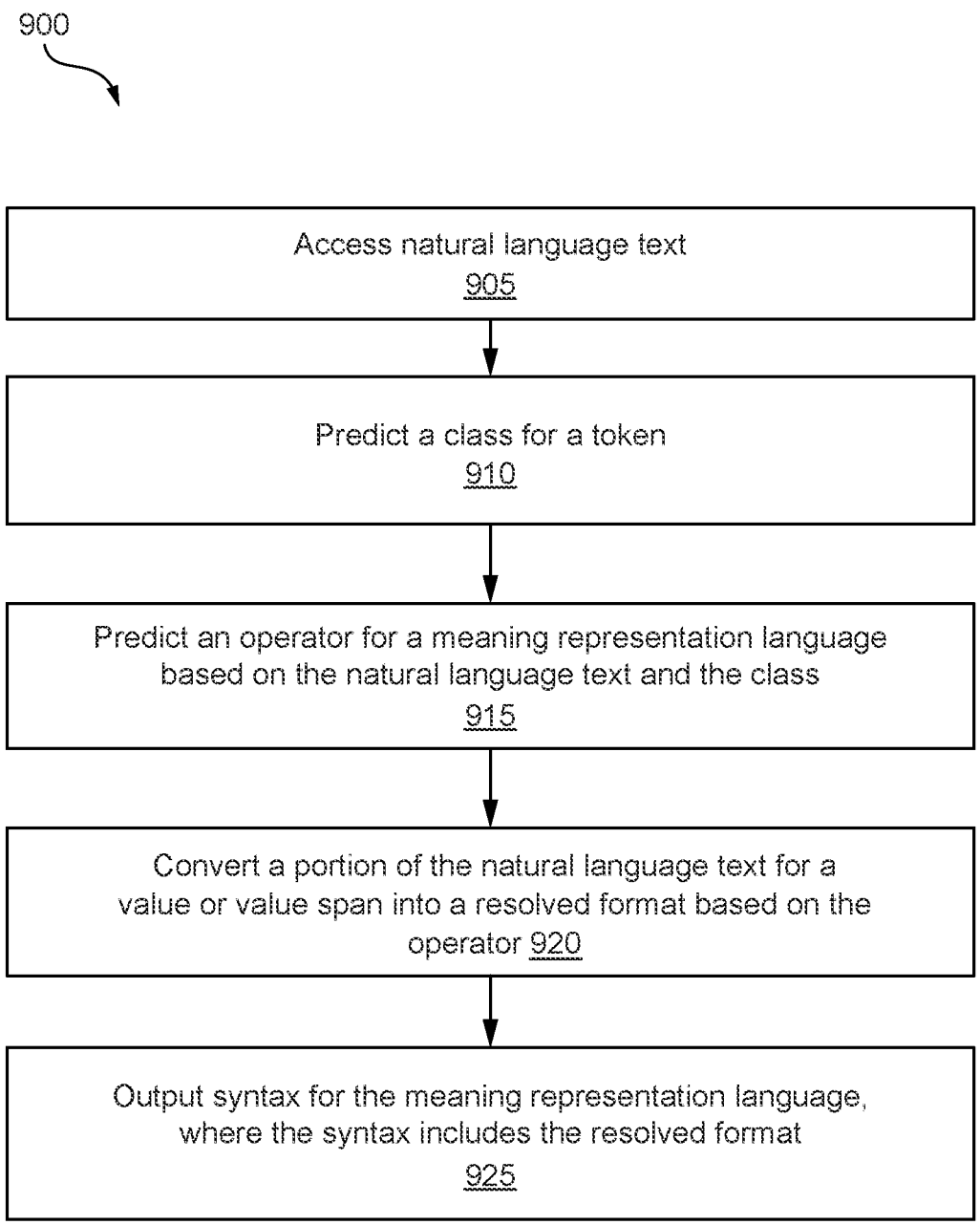
FIG. 9 is a process flow for integrating named entity outputs into a semantic parser in accordance with various embodiments.

FIG. 9 is a flowchart illustrating a process 900 for integrating named entity outputs into a semantic parser in accordance with various embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in a different order, or some steps may also be performed in parallel. In certain embodiments, such as in the embodiments depicted in FIGS. 1-8, the processing depicted in FIG. 9 may be performed by a pre-processing subsystem (e.g., pre-processing subsystem 210 or model system 700) to create, train, update, and deploy one or more machine learning models (implemented as a token classifier and/or semantic parser) using data sets optionally including hierarchical named entities.

At step 905, natural language text is accessed. In some instances, the natural language text is accessed or obtained from a computing system, subsystem, or service. For example, the natural language text may be accessed or obtained in the form of an utterance received from a user.

At step 910, a class label is predicted for a token in the natural language text. The prediction is made by a first machine-learning model such as a pre-trained named entity recognition model. The class label is representative of an individual named entity or composite named entity. In some instances, the class label is a composite named entity label representative of the composite named entity and the composite named entity label comprises multiple named entity classes including a parent class and a child class. In some instances, an entity hierarchy is extracted from the composite named entity label based on a hierarchy template associated with the composite named entity label. The entity hierarchy comprises the multiple named entity classes in a hierarchical structure. The the value or value span for the particular attribute is determined to match the class based on the entity hierarchy, and the natural language text for the value or value span is converted into the resolved format based on the entity hierarchy.

At step 915, based on (a) the natural language text, (b) the class label predicted by the first machine-learning model, and (c) one or more Relation-Aware Transformer features corresponding to the class label predicted by the first machine-learning model, one or more operators are predicted for a meaning representation language and a value or value span is predicted for each of one or more attributes of the one or more operators. The predictions are made by a second machine-learning model such as a sematic parser model. In some instances, the semantic parser model comprises an encoder component and a decoder component, and the encoder component includes: (1) a first encoder, which is a Pre-trained Language Model (PLM), and (2) a second encoder, which is a Relation-Aware Transformer (RAT). The second machine-learning model determines the value or the value spans for the one or more attributes of the one or more operators based on the Relation-Aware Transformer and natural language and does not perform named entity recognition for the value or the value spans for the one or more attributes.

At step 920, a determination is made as to whether the value or value span for a particular attribute of the one or more attributes matches the class label. In response to determining that the value or value span for the particular attribute matches the class label, a portion of the natural language text for the value or value span is converted into a resolved format.

At step 925, syntax for the meaning representation language is output. The syntax comprises the one or more operators with the portion of the natural language text for the value or value span in the resolved format. In some instances, the syntax is processed based on the entity hierarchy, and the processing comprises looking up information related to the syntax, and generating dialogue with the user based on the information and the entity hierarchy. In some instances, converted syntax is generated by converting the syntax for the meaning representation language into a system language, and a query or an operation is executed on a computing system using the converted syntax.

Illustrative Systems

Figure 10:
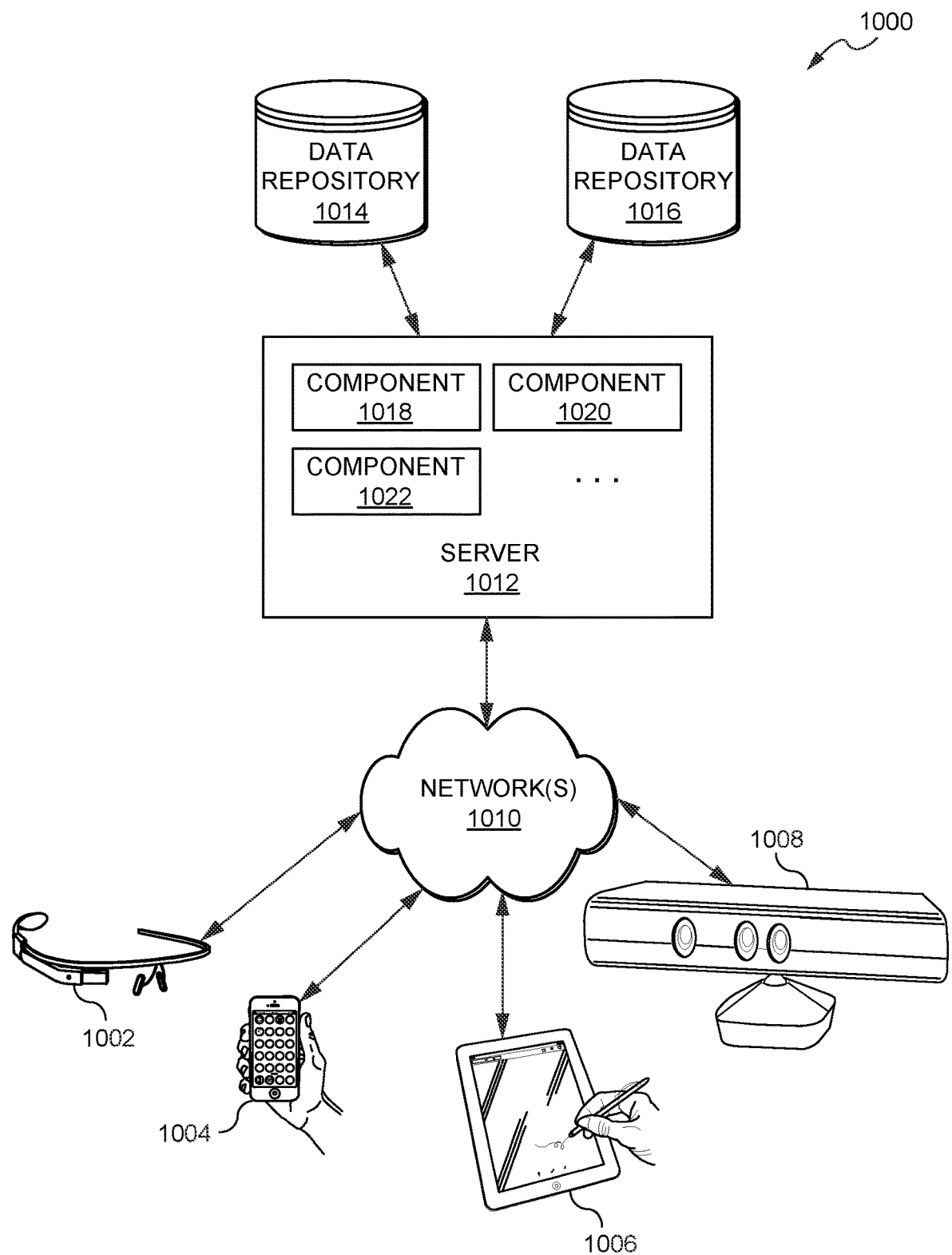
FIG. 10 depicts a simplified diagram of a distributed system for implementing various embodiments.

FIG. 10 depicts a simplified diagram of a distributed system 1000. In the illustrated example, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various examples, server 1012 may be adapted to run one or more services or software applications that enable one or more embodiments described in this disclosure. In certain examples, server 1012 may also provide other services or software applications that may include non-virtual and virtual environments. In some examples, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The example shown in FIG. 10 is thus one example of a distributed system for implementing an example system and is not intended to be limiting.

Users may use client computing devices 1002, 1004, 1006, and/or 1008 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 may include one or more virtual machines running virtual operating systems, or other computing architectures involving virtualization such as one or more flexible pools of logical storage devices that may be virtualized to maintain virtual storage devices for the server. In various examples, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain examples. For example, one or more of the data repositories 1014, 1016 may be used to store information such as information related to chatbot performance or generated models for use by chatbots used by server 1012 when performing various functions in accordance with various embodiments. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain examples, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1014, 1016 may also be used by applications to store application data. The data repositories used by applications may be of different types such as, for example, a key-value store repository, an object store repository, or a general storage repository supported by a file system.

Figure 11:
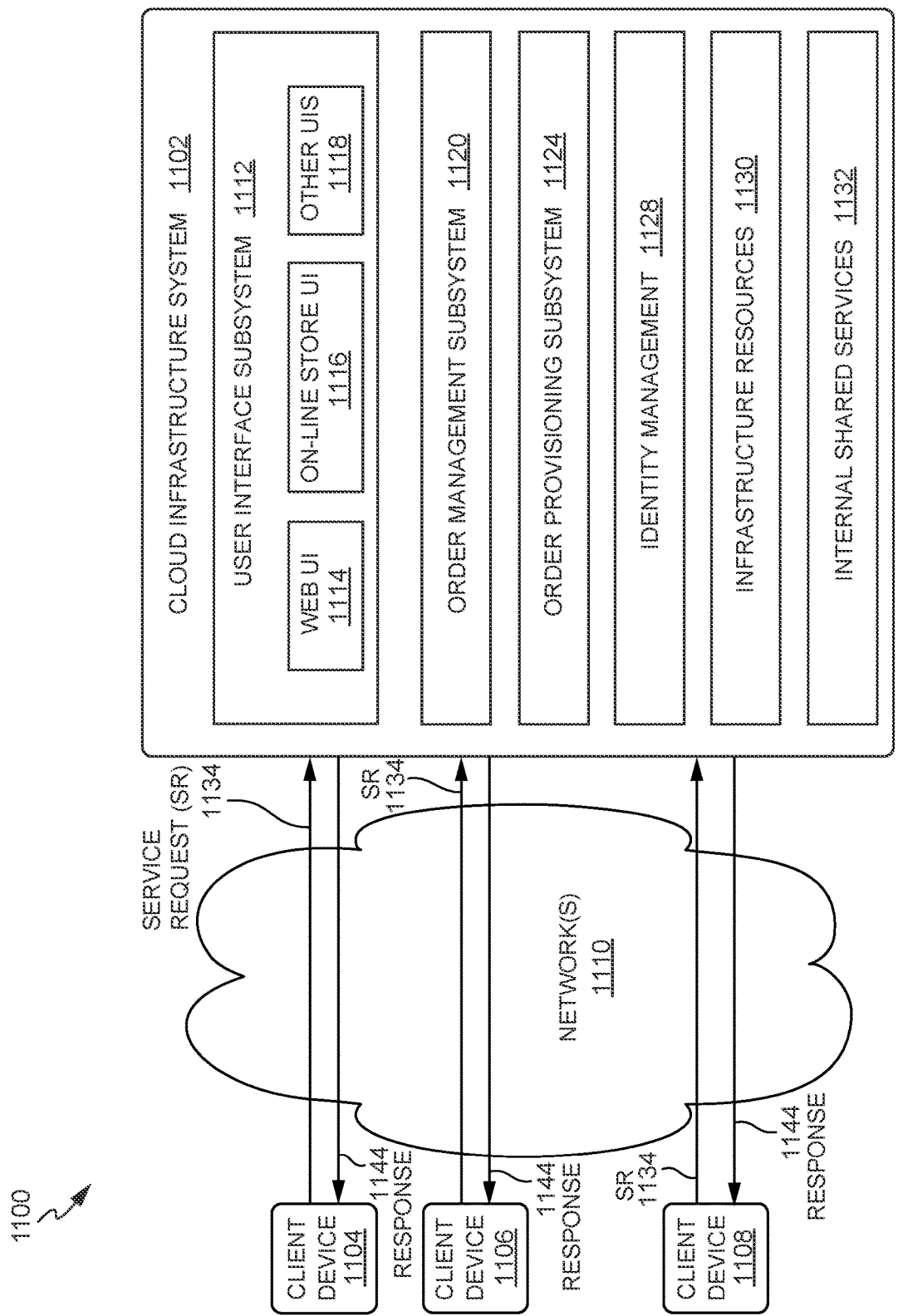
FIG. 11 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 11 is a simplified block diagram of a cloud-based system environment in which various services may be offered as cloud services in accordance with certain examples. In the example depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The example depicted in FIG. 11 is only one example of a cloud infrastructure system and is not intended to be limiting. It should be appreciated that, in some other examples, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative examples.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer may be an individual or an enterprise. In certain other examples, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as client computing devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request information or action from a chatbot as described in this disclosure.

In some examples, the processing performed by cloud infrastructure system 1102 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1102 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like. In certain examples, the storage virtual machines that are available for servicing storage requested from applications may be part of cloud infrastructure system 1102. In other examples, the storage virtual machines may be part of different systems.

In certain examples, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a service offered by cloud infrastructure system 1102. As part of the order, the customer may provide information identifying a chatbot system for which the service is to be provided and optionally one or more credentials for the chatbot system.

In certain examples, such as the example depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1102 as part of the provisioning process. Cloud infrastructure system 1102 may generate an application ID and select a storage virtual machine for an application from among storage virtual machines provided by cloud infrastructure system 1102 itself or from storage virtual machines provided by other systems other than cloud infrastructure system 1102.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1102 and information identifying a chatbot system selected by cloud infrastructure system 1102 for the chatbot system corresponding to the chatbot system ID.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain examples, cloud infrastructure system 1102 comprises an identity management subsystem (IMS) 1128 that is configured to manage customer information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
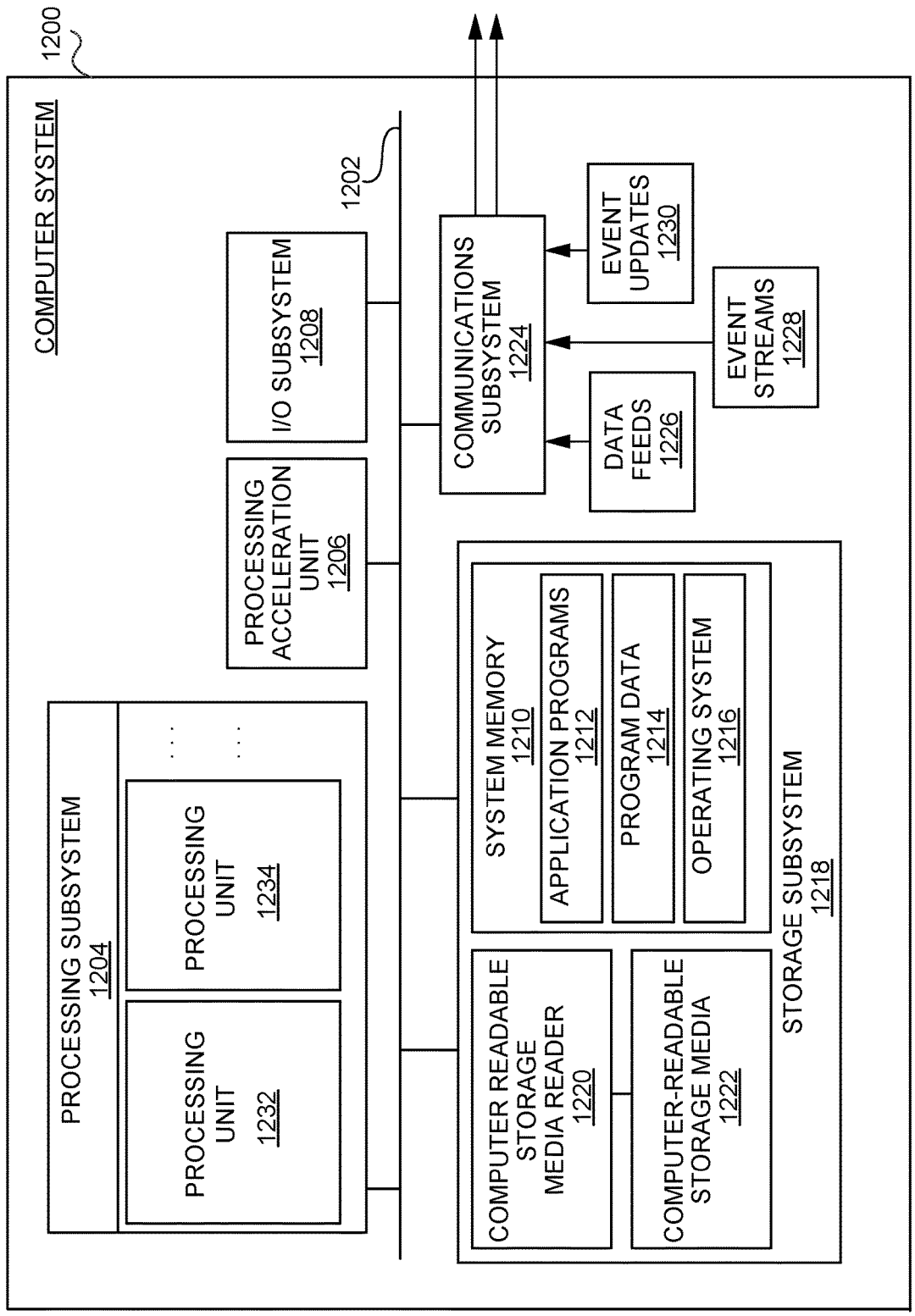
FIG. 12 illustrates an example computer system that may be used to implement various embodiments.

FIG. 12 illustrates an example of computer system 1200. In some examples, computer system 1200 may be used to implement any of the digital assistant or chatbot systems within a distributed environment, and various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative examples of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 may be organized into one or more processing units 1232, 1234, etc. A processing unit may include one or more processors, one or more cores from the same or different processors, a combination of cores and processors, or other combinations of cores and processors. In some examples, processing subsystem 1204 may include one or more special purpose co-processors such as graphics processors, digital signal processors (DSPs), or the like. In some examples, some or all of the processing units of processing subsystem 1204 may be implemented using customized circuits, such as application specific integrated circuits (ASICs), or field programmable gate arrays (FPGAs).

In some examples, the processing units in processing subsystem 1204 may execute instructions stored in system memory 1210 or on computer readable storage media 1222. In various examples, the processing units may execute a variety of programs or code instructions and may maintain multiple concurrently executing programs or processes. At any given time, some or all of the program code to be executed may be resident in system memory 1210 and/or on computer-readable storage media 1222 including potentially on one or more storage devices. Through suitable programming, processing subsystem 1204 may provide various functionalities described above. In instances where computer system 1200 is executing one or more virtual machines, one or more processing units may be allocated to each virtual machine.

In certain examples, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Sin® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some examples. Storage subsystem 12112 may store software (e.g., programs, code modules, instructions) that when executed by processing subsystem 1204 provides the functionality described above. The software may be executed by one or more processing units of processing subsystem 1204. Storage subsystem 1218 may also provide authentication in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some examples. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1218 may also include a computer-readable storage media reader 1220 that may further be connected to computer-readable storage media 1222. Reader 1220 may receive and be configured to read data from a memory device such as a disk, a flash drive, etc.

In certain examples, computer system 1200 may support virtualization technologies, including but not limited to virtualization of processing and memory resources. For example, computer system 1200 may provide support for executing one or more virtual machines. In certain examples, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, when computer system 1200 is used to implement bot system 120 depicted in FIG. 1, the communication subsystem may be used to communicate with a chatbot system selected for an application.

Communication subsystem 1224 may support both wired and/or wireless communication protocols. In certain examples, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1224 may provide wired network connectivity (e.g., Ethernet) in addition to or instead of a wireless interface.

Communication subsystem 1224 may receive and transmit data in various forms. In some examples, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
accessing natural language text;
predicting, by a first machine learning model, a class label for a token in the natural language text, wherein the class label is representative of an individual named entity or a composite named entity;
based on (a) the natural language text, (b) the class label predicted by the first machine-learning model, and (c) one or more Relation-Aware Transformer features corresponding to the class label predicted by the first machine-learning model, predicting, by a second machine-learning model, one or more operators for a meaning representation language and a value or value span for each of one or more attributes of the one or more operators;
determining whether the value or value span for a particular attribute of the one or more attributes matches the class label;
in response to determining that the value or value span for the particular attribute matches the class label, converting a portion of the natural language text for the value or value span into a resolved format; and
outputting syntax for the meaning representation language, wherein the syntax comprises the one or more operators with the portion of the natural language text for the value or value span in the resolved format.

2. The computer-implemented method of claim 1, wherein the class label is a composite named entity label representative of the composite named entity and the composite named entity label comprises multiple named entity classes including a parent class and a child class.

3. The computer-implemented method of claim 2, further comprising extracting an entity hierarchy from the composite named entity label based on a hierarchy template associated with the composite named entity label, wherein the entity hierarchy comprises the multiple named entity classes in a hierarchical structure, wherein the value or value span for the particular attribute is determined to match the class based on the entity hierarchy, and wherein the natural language text for the value or value span is converted into the resolved format based on the entity hierarchy.

4. The computer-implemented method of claim 3, further comprising processing the syntax based on the entity hierarchy, wherein the processing comprises looking up information related to the syntax in a computing system, and generating dialogue with the user based on the information and the entity hierarchy.

5. The computer-implemented method of claim 1, wherein the second machine-learning model determines the value or the value span for each of the one or more attributes of the one or more operators based on the Relation-Aware Transformer features, and does not perform named entity recognition for the value or the value spans for the one or more attributes.

6. The computer-implemented method of claim 1, further comprising generating converted syntax by converting the syntax for the meaning representation language into a system language, and executing a query or an operation on a computing system using the converted syntax.

7. The computer-implemented method of claim 1, wherein the first machine learning model is a pre-trained named entity recognition model and the second machine learning model comprises an encoder component and a decoder component, and wherein the encoder component includes: (1) a first encoder, which is a Pre-trained Language Model (PLM), and (2) a second encoder, which is a Relation-Aware Transformer (RAT).

8. A system comprising:
one or more processors; and
one or more computer-readable media storing instructions which, when executed by the one or more processors, cause the system to perform operations comprising:
accessing natural language text;
predicting, by a first machine learning model, a class label for a token in the natural language text, wherein the class label is representative of an individual named entity or a composite named entity;
based on (a) the natural language text, (b) the class label predicted by the first machine-learning model, and (c) one or more Relation-Aware Transformer features corresponding to the class label predicted by the first machine-learning model, predicting, by a second machine-learning model, one or more operators for a meaning representation language and a value or value span for each of one or more attributes of the one or more operators;
determining whether the value or value span for a particular attribute of the one or more attributes matches the class label;
in response to determining that the value or value span for the particular attribute matches the class label, converting a portion of the natural language text for the value or value span into a resolved format; and
outputting syntax for the meaning representation language, wherein the syntax comprises the one or more operators with the portion of the natural language text for the value or value span in the resolved format.

9. The system of claim 8, wherein the class label is a composite named entity label representative of the composite named entity and the composite named entity label comprises multiple named entity classes including a parent class and a child class.

10. The system of claim 9, wherein the operations further comprise extracting an entity hierarchy from the composite named entity label based on a hierarchy template associated with the composite named entity label, wherein the entity hierarchy comprises the multiple named entity classes in a hierarchical structure, wherein the value or value span for the particular attribute is determined to match the class based on the entity hierarchy, and wherein the natural language text for the value or value span is converted into the resolved format based on the entity hierarchy.

11. The system of claim 10, wherein the operations further comprise processing the syntax based on the entity hierarchy, wherein the processing comprises looking up information related to the syntax in a computing system, and generating dialogue with the user based on the information and the entity hierarchy.

12. The system of claim 8, wherein the second machine-learning model determines the value or the value span for each of the one or more attributes of the one or more operators based on the Relation-Aware Transformer features, and does not perform named entity recognition for the value or the value spans for the one or more attributes.

13. The system of claim 8, wherein the operations further comprise generating converted syntax by converting the syntax for the meaning representation language into a system language, and executing a query or an operation on a computing system using the converted syntax.

14. The system of claim 8, wherein the first machine learning model is a pre-trained named entity recognition model and the second machine learning model comprises an encoder component and a decoder component, and wherein the encoder component includes: (1) a first encoder, which is a Pre-trained Language Model (PLM), and (2) a second encoder, which is a Relation-Aware Transformer (RAT).

15. One or more non-transitory computer-readable media storing instructions which, when executed by one or more processors, cause a system to perform operations comprising:
accessing natural language text;
predicting, by a first machine learning model, a class label for a token in the natural language text, wherein the class label is representative of an individual named entity or a composite named entity;
based on (a) the natural language text, (b) the class label predicted by the first machine-learning model, and (c) one or more Relation-Aware Transformer features corresponding to the class label predicted by the first machine-learning model, predicting, by a second machine-learning model, one or more operators for a meaning representation language and a value or value span for each of one or more attributes of the one or more operators;
determining whether the value or value span for a particular attribute of the one or more attributes matches the class label;
in response to determining that the value or value span for the particular attribute matches the class label, converting a portion of the natural language text for the value or value span into a resolved format; and outputting syntax for the meaning representation language, wherein the syntax comprises the one or more operators with the portion of the natural language text for the value or value span in the resolved format.

16. The one or more non-transitory computer-readable media of claim 15, wherein the class label is a composite named entity label representative of the composite named entity and the composite named entity label comprises multiple named entity classes including a parent class and a child class.

17. The one or more non-transitory computer-readable media of claim 16, wherein the operations further comprise extracting an entity hierarchy from the composite named entity label based on a hierarchy template associated with the composite named entity label, wherein the entity hierarchy comprises the multiple named entity classes in a hierarchical structure, wherein the value or value span for the particular attribute is determined to match the class based on the entity hierarchy, and wherein the natural language text for the value or value span is converted into the resolved format based on the entity hierarchy.

18. The one or more non-transitory computer-readable media of claim 17, wherein the operations further comprise processing the syntax based on the entity hierarchy, wherein the processing comprises looking up information related to the syntax in a computing system, and generating dialogue with the user based on the information and the entity hierarchy.

19. The one or more non-transitory computer-readable media of claim 15, wherein the second machine-learning model determines the value or the value span for each of the one or more attributes of the one or more operators based on the Relation-Aware Transformer features, and does not perform named entity recognition for the value or the value spans for the one or more attributes.

20. The one or more non-transitory computer-readable media of claim 15, wherein the operations further comprise generating converted syntax by converting the syntax for the meaning representation language into a system language, and executing a query or an operation on a computing system using the converted syntax.

* * * * *